United States Patent
Hoshino et al.

(10) Patent No.: US 7,802,237 B2
(45) Date of Patent: Sep. 21, 2010

(54) METHOD, SYSTEM AND COMPUTER PROGRAM PRODUCT FOR GENERATING PROGRAM

(75) Inventors: Hitoshi Hoshino, Nagoya (JP); Yasuhiro Yamada, Okazaki (JP)

(73) Assignee: DENSO CORPORATION, Kariya (JP)

( * ) Notice: Subject to any disclaimer, the term of this patent is extended or adjusted under 35 U.S.C. 154(b) by 1447 days.

(21) Appl. No.: 11/156,494

(22) Filed: Jun. 21, 2005

(65) Prior Publication Data

US 2006/0020949 A1 Jan. 26, 2006

(30) Foreign Application Priority Data

Jun. 29, 2004 (JP) ............... 2004-191242

(51) Int. Cl.
*G06F 9/45* (2006.01)
(52) U.S. Cl. ..................... 717/133
(58) Field of Classification Search .......... 717/133
See application file for complete search history.

(56) References Cited

U.S. PATENT DOCUMENTS

| | | | |
|---|---|---|---|
| 6,467,078 B1 | 10/2002 | Matsuba et al. | |
| 6,871,340 B1 * | 3/2005 | Gillis | 717/100 |
| 6,924,790 B1 * | 8/2005 | Bi | 345/179 |
| 2003/0046660 A1 | 3/2003 | Watanabe | |
| 2005/0028114 A1 * | 2/2005 | Gould et al. | 716/3 |
| 2007/0006150 A9 * | 1/2007 | Walmsley | 717/120 |

FOREIGN PATENT DOCUMENTS

| JP | A-60-178795 | 9/1985 |
|---|---|---|
| JP | A-8-115107 | 5/1996 |

OTHER PUBLICATIONS

Office Action dated Jul. 7, 2009 issued from the Japan Patent Office in corresponding Japanese patent application No. 2004-191242 (English translation enclosed).

* cited by examiner

Primary Examiner—John Chavis
(74) Attorney, Agent, or Firm—Posz Law Group, PLC

(57) ABSTRACT

A program generation program used in a personal computer processes information on relationship between an action and a pair of a state of a system and an event to create a program for incorporating a new state in a state transition table. The computer reads the state transition table in a storage medium and selects the state specified in the state transition table. The computer generates a program that determines whether the selected state is an exceptional state or a normal state on the basis of state information in the state transition table. Based on the result of the determination, the program performs an action including a state transition or a process allocated to the exceptional state specified in the state transition table when the state is the exceptional.

27 Claims, 12 Drawing Sheets

| EVENT | STATE | STATE 1 | STATE 2 | |
|---|---|---|---|---|
| | | | 1 | |
| | | | STATE 2-1 | STATE 2-2 |
| | | 0 | 1-0 | 1-1 |
| E1 | 0 | STATE 2 / PROCESS A | STATE 2-2 | STATE 2-1 / PROCESS B |
| E2 | 1 | | | STATE 1 / PROCESS C |

```c
/* Function for STM0 */
void FuncStm0(void)
{
  State st;
  State st2;
  Event ev;

ev = GetEvent();
  st = GetState(Stm0, -1);

/* Procedure for Event E1 */
  if(ev && EventE1){
    switch(st){
    case 0: /* STATE 1 */
      Action({PROCESS A});
      SetState({STATE 2});
      break;
    case 1: /* STATE 2 */
      st2 = GetState(Stm0, 1);
      switch(st2){
        case 0: /* STATE 2-1 */
          SetState({STATE 2-2});
          break;
        case 1: /* STATE 2-2 */
          Action({PROCESS B});
          SetState({STATE 2-1});
          break;
      }
      break;
    }
  }
  st = GetState(Stm0, -1);
/* Procedure for Event E2 */
  if(ev && EventE2){
    switch(st){
    case 0: /* STATE 1 */
      /* NO PROCESSING */
      ;
      break;
    case 1: /* STATE 2 */
      st2 = GetState(Stm0, 1);
      switch(st2){
      case 0: /* STATE 2-1 */
        /* NO PROCESSING */
        ;
        break;
      case 1: /* STATE 2-2 */
        Action({PROCESS C});
        SetState({STATE 1});
        break;
      }
      break;
    }
  }
}
```

| STATE | default | STATE 2 | | | exception |
|---|---|---|---|---|---|
| | | 1 | | | |
| | STATE 1 | default | | exception | EXCEPTIONAL STATE |
| | | STATE 2-1 | STATE 2-2 | EXCEPTIONAL STATE | |
| EVENT | 0 | 1-0 | 1-1 | 1-* | * |
| E1  0 | STATE 2 / PROCESS A | STATE 2-2 | STATE 2-1 / PROCESS B | STATE 2-1 / EXCEPTIONAL PROCESS Y | STATE 1 / EXCEPTIONAL PROCESS X |
| E2  1 | | | STATE 1 / PROCESS C | STATE 2-1 / EXCEPTIONAL PROCESS Y | STATE 1 / EXCEPTIONAL PROCESS X |

FIG. 10

```
01: /* Function for STM0 */
02: void FuncStm0(void)
03: {
04:   State st;
05:   State st2;
06:   Event ev;

07:   ev = GetEvent();

08: /* Procedure for Event E1 */
09: if(ev && EventE1){
10:   st = GetState(Stm0, -1);
11:   switch(st){
12:     case 0: /* STATE 1 */
13:       Action({PROCESS A});
14:       SetState({STATE 2});
15:       break;
16:     case 1: /* STATE 2 */
17:       st2 = GetState(Stm0, 1);
18:       switch(st2){
19:         case 0: /* STATE 2-1 */
20:           SetState({STATE 2-2});
21:           break;
22:         case 1: /* STATE 2-2 */
23:           Action({PROCESS B});
24:           SetState({STATE 2-1});
25:           break;
26:         default: /* EXCEPTION */
27:           Action({EX-PROCESS Y});
28:           SetState({STATE 2-1});
29:           break;
30:       }
31:       break;
32:     default: /* EXCEPTION */
33:       Action({EX-PROCESS X});
34:       SetState({STATE 1});
35:       break;
36:   }
37: }

38: /* Procedure for Event E2 */
39: if(ev && EventE2){
40:   st = GetState(Stm0, -1);
41:   switch(st){
42:     case 0: /* STATE 1 */
43:       /* NO PROCESSING */
44:       ;
45:       break;
46:     case 1: /* STATE 2 */
47:       st2 = GetState(Stm0, 1);
48:       switch(st2){
49:         case 0: /* STATE 2-1 */
50:           /* NO PROCESSING */
51:           ;
52:           break;
53:         case 1: /* STATE 2-2 */
54:           Action({PROCESS C});
55:           SetState({STATE 1});
56:           break;
57:         default: /* EXCEPTION */
58:           Action({EX-PROCESS Y});
59:           SetState({STATE 2-1});
60:           break;
61:       }
62:       break;
63:     default: /* EXCEPTION */
64:       Action({EX-PROCESS X});
65:       SetState({STATE 1});
66:       break;
67:   }
68: }
69: }
```

\* EXEPTION : EXCEPTIONAL STATE
\* EX-PROCESS : EXCEPTIONAL PROCESS

METHOD, SYSTEM AND COMPUTER PROGRAM PRODUCT FOR GENERATING PROGRAM

CROSS REFERENCE TO RELATED APPLICATION

This application is based on and claims the benefit of priority of Japanese Patent Application No. 2004-191242 filed on Jun. 29, 2004, the disclosure of which is incorporated herein by reference.

FIELD OF THE INVENTION

The present invention relates to a variation of software for generating a program and, more specifically to a variation of software used in an embedded control system.

BACKGROUND OF THE INVENTION

In the field of embedded control systems, a software conventionally controls the system so that an event (a change in an input signal received from outside a system or a change) occurring in the system triggers an action associated with the event, and the action causes a consequence such as transition of a state of the system or a process being executed in a state.

A software developer prepares correspondence information that specifies allocation of an action to a pair of the state of the system and the event as specifications for the system. The correspondence information is expressed in a tabular form as a state transition table or in a diagrammatic form as a state transition diagram.

Based on the correspondence information, the developer writes a program, which implements the system by, for example, a source code written in programming language such as C language or the like. In recent years, a program generation system that, upon receipt of an input of a state transition table or a state transition diagram, automatically translates the contents of the state transition table or diagram into the source code in the programming language has been developed (refer to, for example, Japanese Patent Document JP-A-2003-76543).

An example of conventional program generation based on the correspondence information is described with reference to FIG. 1 to FIG. 3. FIG. 1 shows an example of a state transition table that has been employed. In the table, each row specifies one event and each column specifies one state. That is, a transition from a state 1 to a state 2 and an action of performing process A are allocated to a pair of the state 1 and an event E1.

In the state transition table, a state has a hierarchical structure permitting one state to include child states. For example, the state 2 includes states 2-1 and 2-2 in FIG. 1. A state marked with an inverted triangle 41 or 42 is a state to which a transition will be made first on a hierarchical level to which the state belongs.

FIG. 2 shows an example of a state transition diagram that has been employed. In the diagram, a state is expressed with a rectangle having rounded corners. A transition from one state to another is expressed with an arrow. Characters appended to the arrow signify both an event that brings about a state transition expressed with the arrow, and the process to be performed when the event takes place.

That is, an arrow from a rectangle of a certain state and characters appended thereto specifies the state and the event expected to occur in the state. The arrow with the appended characters also specifies an action allocated to the pair of the state and the event.

Further, rectangles expressing child states subordinate to a certain state are drawn in a rectangle expressing the state in the state transition diagram. A state in the rectangle having an arrow starting with a black circle is the state to which a transition from another state is made first on a hierarchical level of the states.

The behavior of a system specified in the state transition table shown in FIG. 1 is identical to the behavior of a system specified in the state transition diagram shown in FIG. 2. That is, the table and diagram specify four actions described below.

(1) When an event E1 occurs in a state 1, process A is executed and a transition is made to a state 2-1.

(2) When the event E1 occurs in the state 2-1, a transition is made to a state 2-2.

(3) When the event E1 occurs in the state 2-2, process B is executed and a transition is made to the state 2-1.

(4) When an event E2 occurs in the state 2-2, processing C is executed and a transition is made to the state 1.0

FIG. 3 is a list of instructions included in a source code of C language generated by a conventional program generation system using the correspondence information shown in FIGS. 1 and 2. The C source code is described so that any of the foregoing actions (1) to (4) is performed depending on a pair of a state and an event specified by a GetState function, which represents reading of a current system state from the storage medium, and a GetEvent function, which represents reading of an event that currently takes place from the storage medium, respectively.

However, the conventional program generation system only defines conceivable states of the target system and associated actions in the specifications. That is, an action associated with a state that is not expected in a design stage of the system is described in neither of the specifications nor a generated program.

Therefore, a program generated by the conventional program generation system creates unsteady state of the system that the behavior of the system becomes totally unpredictable in a case where data supplied to the program for representing the state of the system changes to an unpredictable value for some reason. The unsteadiness of the system makes it impossible for the program to be used in an automotive system or the like that highly appreciates steadiness and consistency.

SUMMARY OF THE INVENTION

In view of the above-described problems, it is an object of the present invention to provide a method for controlling unsteadiness of a target computer system even when a state transition of the system is in an unpredictable manner during execution of a program that controls a state transition in the target computer system by utilizing correspondence information that specifies allocation of an action (e.g., state transition) to a pair of a state of the system and an event.

The object of the invention is achieved and presented as a program generation system for generating a target program that controls the target system and a program generation program for controlling the program generation system as well as the method for generating the target program and the correspondence information by using the program generation program and the program generation system.

The first feature of the present invention for accomplishing the above object exists in that a program generation program implements in the computer system a function "that reads correspondence information specifying allocation of the action to the state, determines whether the state specified in the correspondence information is an exceptional state or a normal state on the basis of whether the correspondence information includes information signifying that the state is the exceptional state, and generates a control program on the basis of the correspondence information."

The control program implements in the computer system a function "that detects a current state according to state information stored in the storage medium, performs the action, which is specified in the correspondence information to be allocated to the state, on condition that a detected state corresponds to the normal state, and performs the action, which is specified in the correspondence information to be allocated to the exceptional state, on condition that the detected state does not correspond to any normal state."

In this manner, when the computer system that executes the program generation program reads correspondence information which specifies the exceptional state and includes information signifying that the state is the exceptional state, the computer system generates the control program that performs the action, which is specified in the correspondence information to be allocated to the exceptional state, on condition that "the detected state does not correspond to any of the normal states."

In program generation based on the correspondence information, even when the state of the system becomes unpredictable during execution of the generated control program, the action allocated to the exceptional state is performed. Therefore, the system will not behave unpredictably. In this manner, according to the present invention, the unsteadiness in the behavior of the system can be suppressed.

A "state recognized as the normal state by the determining means" shall be simply referred to as the normal state, and a "state recognized as the exceptional state by the determining means" shall be simply referred to as the exceptional state in the following description.

Further, the correspondence information that the computer system reads by executing a program execution program specifies allocation of the action to a pair of the state and the event. The function which the control program implements in the computer system may perform the action, which is specified in the correspondence information to be allocated to a pair of the detected state and a detected event, on condition that the detected state corresponds to the normal state, and may perform the action, which is specified in the correspondence information to be allocated to a pair of the exceptional state and the detected event, on condition that the detected state does not correspond to any of the normal states. When the action to be performed includes the state transition, a destination state to which a transition is made may be stored as the state information in the storage medium.

In this manner, the behavior of a system to be made in case the detected state does not correspond to any of the normal state can be precisely designated depending on the event that takes place.

More practically, among functions which the program generation program implements in the computer system, a reading function may read the correspondence information, which specifies allocation of the action to a pair of the state and the event, for each pair. Every time the correspondence information is read for each pair, a determining function may determine whether the state included in the pair is the exceptional state or the normal state. Every time the state included in the pair is recognized as the exceptional state, part of the control program that implements in the computer system the function "that performs the action, which is specified in the correspondence information to be allocated to the exceptional state, on condition that the detected state does not correspond to any of the normal states" may be generated.

Further, the exceptional state is the state recognized when the detected state does not correspond to any of the normal states. When the action specified in the correspondence information includes transition to the exceptional state, a drawback may take place. Therefore, the program generation program may allow the computer system to send a warning message on condition that the action specified in the correspondence information to be allocated to one state includes the state transition to the exceptional state.

In this manner, a software developer is warned that the state to be changed to the exceptional state is specified in the correspondence information. This minimizes the possibility that the developer may specify the state, which will be changed to the exceptional state, in the correspondence information.

Further, the state specified in the correspondence information may have a hierarchical structure permitting one state to include a plurality of states as child states. In this case, the computer system that executes the control program to be generated may perform the action, which is specified in the correspondence information to be allocated to the exceptional state that is a child of a normal state, on conditions that the detected state corresponds to the normal state but does not correspond to any of the normal states that are child states of the normal state.

The program generation program may be created so that the computer system that executes the program will send the warning message on condition that the exceptional state specified in the correspondence information includes the child states. This minimizes the possibility that the software developer may specify the child states of the exceptional state in the correspondence information.

The program generation program may be created so that the computer system that executes the program will send the warning message on condition that one state specified in the correspondence information includes a plurality of the exceptional states as child states. This minimizes the possibility that a situation in which one state includes a plurality of the exceptional states as child states, that is, the situation in which a plurality of the exceptional states belongs to the same hierarchical level may take place.

Further, the "information signifying that the state is the exceptional state" included in the correspondence information may be predetermined information appended to a name of the state specified in the correspondence information, or a predetermined data item that indicates whether information contained therein is the exceptional information.

The correspondence information may be graphic information including graphics for expressing the state and transition between the states. That is, the arrow links the rectangles so that a transition between two states is graphically expressed. The "information signifying that the state is the exceptional state" may be information signifying that a graphic has a predetermined shape.

The first feature of the present invention can be grasped as a program generation system that implements a function defined by the program generation program, or as a program generation method for implementing a procedure defined by the program generation program.

The second feature of the present invention exists in that a correspondence information generation program which implements in the computer system the function for storing the correspondence information, which specifies allocation of the action to the state, in the storage medium according to a user's input further implements in the computer system a function for receiving a user's designative input of the exceptional state and the action associated with the exceptional state, and a function for storing the correspondence information, which includes information specifying allocation of a received associated action to a received exceptional state and information signifying that the state is the exceptional state, in the storage medium so that the program generation system can read the correspondence information.

In this manner, the correspondence information including the information that specifies allocation of the action to the exceptional state and the information signifying that the state is the exceptional state is stored in the storage medium according to the user's input of the exceptional state and the associated action. The program generation system generates the control program according to the correspondence information.

In program generation based on the correspondence information, even when the state becomes unpredictable during execution of the generated control program, the action allocated to the exceptional state is performed. Therefore, the system will not behave unpredictably. According to the present invention, the unsteadiness in the behavior of the system can be suppressed.

The correspondence information generation program may be created so that it will send the warning message on condition that the computer system that executes the program receives the designative input of the action that includes the state transition to the exceptional state. In this manner, warning is given against that the state to be changed to the exceptional state is specified in the correspondence information. This minimizes the possibility that the software developer specifies the state, which is changed to the exceptional state, in the correspondence information.

The state specified in correspondence information may have the hierarchical structure permitting one state to include a plurality of the states as child states. In this case, the correspondence information generation program may be created so that it will send the warning message on condition that the received exceptional state is a child of the normal state and other exceptional state is specified as the child of the normal state in the correspondence information. This minimizes the possibility that a situation in which one state includes a plurality of the exceptional states as child states, that is, a situation in which a plurality of the exceptional states belongs to the same hierarchical level may take place.

The correspondence information generation program may be created so that the computer system that executes the program will send the warning message on condition that the computer system receives the user's input permitting the exceptional state to include the child states. This minimizes the possibility that the software developer may specify child states of the exceptional state in the correspondence information.

The correspondence information generation program is created so that the computer system that executes the program will display an image on a display device according to the correspondence information. The image to be displayed is represented by the graphic information that specifies the graphics expressing the states and arrows linking the graphics to express the state transitions. The graphic expressing the state may be different between the normal state and the exceptional state. In this manner, the user can easily distinguish the normal state from the exceptional state.

The correspondence information generation program is created so that the computer system that executes the program will display the image on the display device according to the correspondence information. The image to be displayed expresses a relationship of correspondence between the states and the actions in a tabular form. In the table, the exceptional state may bear a mark identifying the exceptional state. In this manner, the user can easily discriminate the normal state from the exceptional state.

The second feature of the present invention may be grasped as the correspondence information generation system that implements a function defined by the correspondence information generation program, or a correspondence information generation method for implementing a procedure defined by the correspondence information generation program.

The third feature of the present invention exists in that a program generation program reads correspondence information specifying allocation of the action to the state, determines whether the action to be performed when the state becomes exceptional is specified in the correspondence information, and generates the control program according to the correspondence information.

The control program implements in the computer system the function that "detects the current state according to the state information stored in the storage medium, performs the action which is specified in the correspondence information to be allocated to the state that is specified in the correspondence information to correspond to the detected state, and performs the action, which is specified in the correspondence information to be performed when the state becomes exceptional, on condition that the detected state does not correspond to any of the states specified in the correspondence information."

In this manner, when the computer system that executes the program generation program reads correspondence information that specifies the action to be performed when the state becomes exceptional, the computer system generates the control program that performs an action, which is specified in the correspondence information to be allocated to the exceptional state, on condition that the detected state does not correspond to any of states specified in the correspondence information.

When program generation is achieved based on the correspondence information, even when the state becomes unpredictable during execution of the generated control program, the action that is specified in the correspondence information to be performed when the state becomes exceptional is performed. Therefore, the computer system will not behave unpredictably. Thus, the present invention can suppress the unsteadiness in the behavior of the system.

Further, the state specified in the correspondence information may have the hierarchical structure permitting one state to include a plurality of the states as child states. In this case, the generated control program may allow the computer system, which executes the control program, to perform the action, which is specified in the correspondence information in association with the hierarchical level, to which child states of the state belong, so that the action will be performed when the state becomes exceptional, on condition that the detected state corresponds to the certain state specified in the correspondence information but does not correspond to any of the child states of the certain state.

Further, the third feature of the present invention may be grasped as the program generation system that implements the function defined by the program generation program or the program generation method for implementing the procedure defined by the program generation program.

The fourth feature of the present invention exists in that the correspondence information generation program which implements in the computer system a function that stores correspondence information, which specifies allocation of the associated action to the state, in the storage medium according to the user's input further implements in the computer system a function that "receives the user's designative input of the action to be performed when the state becomes exceptional, and stores the correspondence information, which specifies the received action, in the storage medium so that the aforesaid program generation system can read the correspondence information."

In this manner, according to the user's designative input of the action specified to be performed when the state becomes exceptional, the correspondence information including information specifying the action is stored in the storage medium, and the aforesaid program generation system generates the control program according to the correspondence information.

In program generation based on the correspondence information, even when the state becomes unpredictable during execution of the generated control program, the action allocated to the exceptional state is performed. Therefore, the computer system will not behave unpredictably. Thus, the present invention can suppress the unsteadiness in the behavior of the system.

The fourth feature of the present invention can be grasped as a correspondence information generation system that implements a function defined by the correspondence information generation program or a correspondence information generation method for implementing the procedure defined by the correspondence information generation program.

BRIEF DESCRIPTION OF THE DRAWINGS

Other objects, features and advantages of the present invention will become more apparent from the following detailed description made with reference to the accompanying drawings, in which:

FIG. 3 is a list of instructions constituting a C source code generated from the conventional state transition table or the state transition diagram;

FIG. 10 is a list of instructions constituting a C source code generated from the state transition table shown in FIG. 5 by executing the program generation program;

DETAILED DESCRIPTION OF THE PREFERRED EMBODIMENTS

First Embodiment

Figures 1, 2:
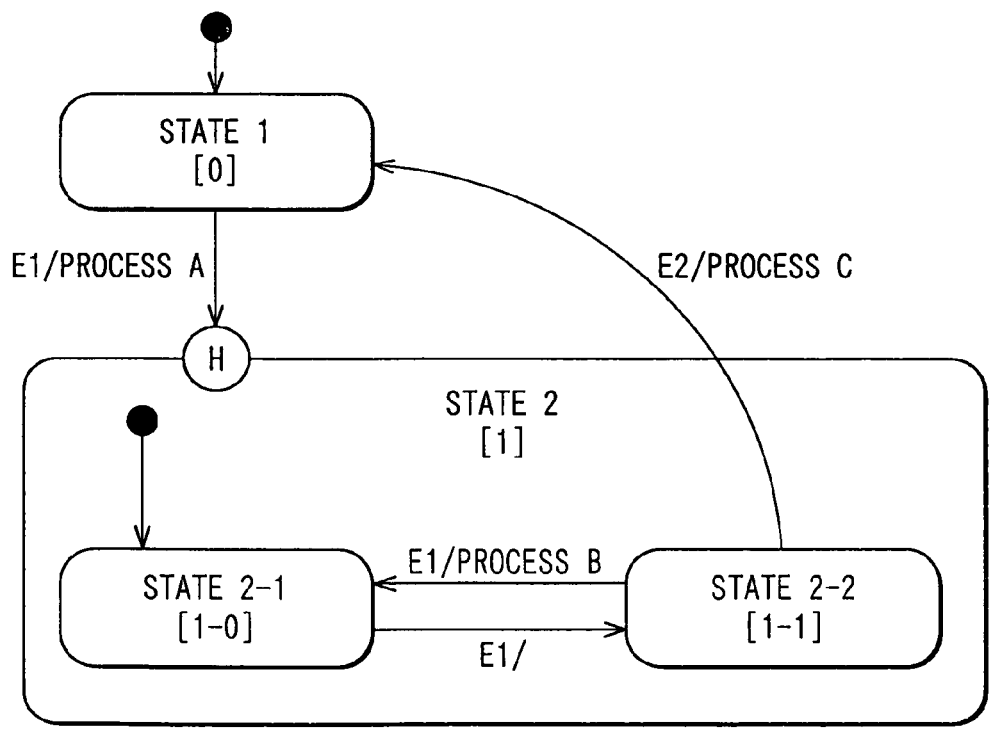
FIG. 1 is a conventional state transition table.
FIG. 2 is a conventional state transition diagram.
Figures 4, 5:
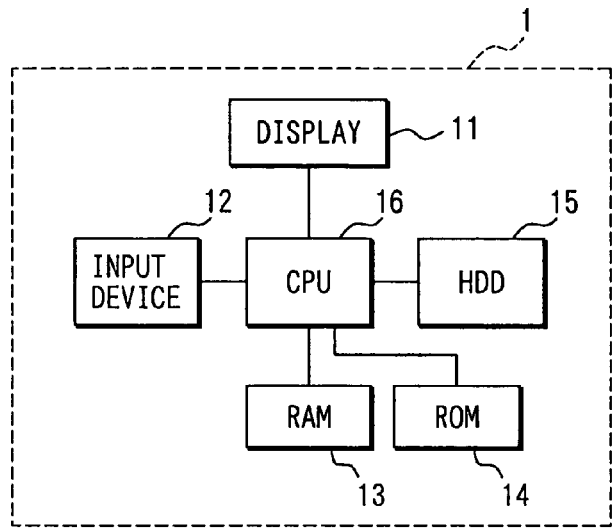
FIG. 4 is a block diagram of a personal computer system according to a first embodiment of the present invention.
FIG. 5 is an example of a state transition table according to the first embodiment.

A first embodiment of the present invention is described with reference to the drawings. FIG. 4 shows the configuration of a personal computer system 1 serving as both a program generation system and a correspondence information generator according to the present embodiment. The personal computer system 1 comprises a display 11, an input device 12, a RAM 13, a ROM 14, a hard disk drive (HDD) 15, and a CPU (equivalent to an arithmetic unit) 16.

The display 11 presents a video signal, which is received from the CPU 16 (equivalent to a computer system), to a user (software developer) in a form of an image.

The input device 12 comprises a keyboard and a mouse, and transmits a signal to the CPU 16 responsively to a operation performed thereon by the user.

The RAM 13 is a volatile storage medium that is readable and writable. The ROM 14 is a read-only nonvolatile storage medium. The HDD 15 is a nonvolatile storage medium that is readable and writable. Programs that the CPU 16 reads and executes are stored in the ROM 14 and HDD 15. Further, a model to be described later is stored in the HDD 15.

The RAM 13 is used as a storage area in which a program the CPU reads from the ROM 14 or HDD 15 and executes is temporarily preserved or a storage area in which work data is temporarily preserved.

When a power is supplied to the personal computer system 1, the CPU 16 reads a predetermined boot program from the ROM 14 and executes it. The CPU 16 reads an operating system (OS) defined by the boot program and other programs from the HDD 15, and executes them, whereby startup is achieved. After the startup is complete, the CPU 16 executes various programs, which are recorded in the HDD 15, as processes on the OS according to signals sent from the input device 12 or schedules or the like predetermined by the OS until the power to the personal computer system 1 is turned off. In the startup or any other process, if necessary, the CPU 16 receives an input of the signal from the input device 12, transmits the video signal to the display 11, or controls reading or writing of data from or to the RAM 13 or HDD 15.

The CPU 16 executes a program generation program. The program generation program references correspondence information stored in the RAM 13 or HDD 15.

What is referred to as the correspondence information is information on allocation of an action to a pair of a state and an event. The user may prepare the correspondence information using a text editor, a spreadsheet application, or the like. The CPU 16 executes a correspondence information generation program, whereby a function for allocating the action to a pair of the state and the event according to a user's input of the state, the event, and the action, storing the correspondence information, which specifies allocation, in the HDD 15, and presenting the correspondence information to the user is implemented in the CPU 16.

Examples of the correspondence information are a state transition table and a state transition diagram. The program generation program is a program that reads the correspondence information, determines whether the state specified in the correspondence information is an exceptional state or a normal state, and generates a source code that implements functions (1) to (3) described below in the computer system 1.

Function (1): detecting a current state according to state information stored in the storage medium.

Function (2): detecting occurrence of the event.

Function (3): performing the action allocated to a detected state and a detected event.

More practically, the function (3) performs the action, which is specified in the correspondence information to be allocated to a pair of the detected state and the detected event, on condition that "the detected state corresponds to the normal state," and performs the action, which is specified in the correspondence information to be allocated to the exceptional state and the detected event on condition that "the detected state does not correspond to any of the normal states devoid of a child."

In the description of the functions implemented by the source code, what is referred to as the normal state is the state recognized as the normal state by executing the program generation program 100. Further, the exceptional state refers to the state recognized as the exceptional state by executing the program generation program 100.

What is referred to as the state is the state of code execution in which the computer system 1 can execute an object code generated by compiling the source code. In the present embodiment, one state can include a plurality of states as child states (i.e., child state). Each of the child states can further include a plurality of states as child states. Child states of one state belong to a same hierarchical level. Further, a state that is not a child of any state belongs to the highest hierarchical level of the state.

Therefore, the state may be structured on hierarchical levels, and a parent-child relationship may be recursive for an arbitrary number of hierarchical levels.

Further, the state of execution corresponds to any of the states devoid of the child (hereinafter a terminal state) as long as the source code is executed expectedly. In the present embodiment, the current state of execution corresponds to all states (parent states, parent states of the parent states, and so on) including the terminal state that corresponds to the state of execution.

Further, in the present embodiment, what is referred to as the child state of a state is a state which the state includes as an immediately subordinate state. For example, assuming that a state a includes states b and g as child states and the state b includes states d and e as child states, the states d and e are not child states of the state a but are grandchild states thereof.

What is referred to as the event is a stimulus to the computer system 1, such as, a change in the input from outside the computer system 1 occurring during execution of a program or a change occurring inside the computer system 1. Further, the action refers to arithmetic operations defined by the program, the input, an output, or a state transition.

Operation of the CPU 16 that executes the program generation program is described with reference to the drawings. FIG. 5 shows an example of the correspondence information that the CPU 16 refers to generate the source code according to the present embodiment.

The correspondence information illustrated in FIG. 5 is the state transition table in a tabular form. The state transition table has cells juxtaposed in three rows and six columns. Each of the rows except the uppermost row specifies pieces of information on actions associated with one event. Each of the columns except the leftmost column specifies pieces of information on actions associated with one terminal state. In the state transition table, the cell included in one row and in one column specifies the action to be performed in response to the event associated with the row when the computer system 1 stays in the terminal state associated with one column.

A name and an identification number of the event associated with each row are specified in the cell included in the leftmost column and in the row. The name and the identification number of the state associated with each column are specified in the cell included in the column and in the uppermost row. For example, the second row is the row associated with the event having the name is E1 and the identification number is 0. The fourth column is the column associated with the state having the name is 2-2 and the identification number is 1-1. In the cell included in the uppermost row and in the column associated with the terminal state, names and identification numbers of all states including the terminal state are specified downward in hierarchical order.

Rules for assigning the identification number to the state is described. First, the identification number to be assigned to the state in the highest hierarchical level includes one numeral. The identification-numbers to be assigned to the other states are created respectively by appending one hyphen and one inner-hierarchical level number to the identification number of a parent state. The inner-hierarchical level number refers to the numeral assigned so that states in the same hierarchical level will not bear a same number.

For example, in the state transition table of FIG. 5, the identification number of a state 2 is a numeral 1, and the identification number of a state 2-2 is 1-1 created by appending a hyphen to the identification number of the state 2 and further appending an own inner-hierarchical level number of 1 thereto.

Owing to the foregoing data structure, the state transition table specifies allocation of one action to each pair of the terminal state and the event.

In all cells in the first row except the leftmost cell, a Default mark or an Exception mark may be specified. The presence of the Default mark signifies that the state associated with the cell is an initial state. The presence of the Exception mark signifies that the state associated with the cell is the exceptional state. Therefore, the Default mark and Exception mark are predetermined data items signifying the state is in the exceptional state.

Each of the columns of the state transition table shown in FIG. 5 specifies the actions associated with the terminal state. The state transition table may have a column associated with any state other than the terminal state. The column associated with any state other than the terminal state specifies the actions to be performed in response to the events in the respective rows.

Next, the program generation program for implementing the function, which is defined by the state transition table, in the computer system 1 is described with reference to the drawings. FIGS. 6 to 9 are flowcharts describing the program generation program 100. FIG. 10 shows a C source code which the CPU 16 generates using the state transition table in FIG. 5 by executing the program generation program 100. Line numbers appearing on the left of each line in FIG. 10 are used for a sake of clarity and are not written in the actual source code.

The CPU 16 executes the program generation program 100 when the CPU 16 detects a predetermined startup operation of the user by using the input device 12.

First, in Step S110, the CPU 16 executes overall preprocessing. For example, a work area is reserved in the RAM 13 for storing the generated C source code and the codes written in the first to seventh lines and the sixty-ninth line in FIG. 10 are generated from the state transition table in FIG. 5. The codes in the first to the third lines and the code in the sixty-ninth line are statements needed to describe an entire C source code shown in FIG. 10 as one function. A portion enclosed with curly brackets written in the third and sixty-ninth lines describes the contents of processing represented by the function.

The fourth and fifth lines read type statements for variables st and st2 in which a current state is specified. The sixth line reads the type statement for a variable ev in which an event that occurs is specified. The seventh line reads the statement for calling a GetEvent function. By assigning a return value of the GetEvent function to the variable ev, information on the event having occurred and being stored in the storage medium is referenced. The GetEvent function is defined externally so that a call of the GetEvent function returns the identification number of the event that has occurred after a previous call of the GetEvent function as the return value.

The contents of the range from the first line to the seventh line may be modified through post-processing described later according to the contents of the state transition table.

In Step S120, the state transition table is read from the RAM 13 or HDD 15. A first event specified in the state transition table, that is, the event specified in a second row is selected. For example, an event E1 in FIG. 5 is selected.

In Step S130, the result of the process of Step S120 or Step S180 described later is checked to see if an event is currently selected. When the event is selected, Step S140 is executed. When no event is selected, Step S190 is executed.

In Step S140, a code for preprocessing to be performed in a selected event is generated. More practically, a statement specifying a condition that must be met in order to perform the action allocated to the selected event is generated. For example, a comment control statement and an IF statement described in the eighth and ninth lines respectively and associated with the event E1, and a comment control statement and an IF statement described in the thirty-eighth and thirty-ninth lines respectively and associated with an event E2 are comparable to the code for preprocessing. An evaluative expression (ev && EventE1) contained in the IF statement written in the ninth line is true only when the event E1 is taking place. Further, an evaluative expression (ev && EventE2) in the thirty-ninth line is true only when the event E2 is taking place.

In Step S150, a hierarchical level of the states is set to the highest level. That is, the highest hierarchical level, that is, a hierarchical level to which states devoid of a parent belong is assigned to a hierarchical-level variable that designates a set hierarchical level in the state transition table stored in the RAM 13. The hierarchical-level variable includes information on the identification number of the parent state of the states for specifying the hierarchical level of the states. That is, the hierarchical-level variable is the information that indicates whose child hierarchical level the hierarchical level of the states is. However, the hierarchical-level variable includes information signifying that the hierarchical level of the states is not a child hierarchical level of any hierarchical level of the states when the hierarchical level of the states is the highest hierarchical level.

In Step S160, a subroutine 200 that performs the process for each state in the selected event being specified in Step S120 or Step S180 is called. Owing to the process, the action allocated to a pair of the selected event and each state is described as an executable statement that represents the action for the event in the state. The action is appended to the preprocessing statement generated in Step S150. The subroutine 200 is further described later in the present embodiment.

In Step S170, a code representing post-processing for the selected event is generated. More practically, a statement specifying the end of a routine that describes actions allocated to the selected event is generated to be appended to the code generated in Step S160. For example, curly brackets indicating the end of an IF block and being written in the thirty-seventh and sixty-eighth lines respectively in FIG. 5 are the codes for the post-processing for the state transition table shown in FIG. 5.

In Step S180, the next event in the state transition table is selected. What is referred to as the next event is one of the events associated with the rows of the state transition table that has not been selected since execution of the program generation program 100 started. The program selects no event when it does not find an event that has not been selected since the execution of the program generation program 100 started. Step S130 is executed after Step S180.

Overall post-processing is performed in Step S190 when no event selection is recognized in Step S130. For example, the contents of the range from the first line to the seventh line are modified based on the state transition table shown in FIG. 5.

Figure 6:
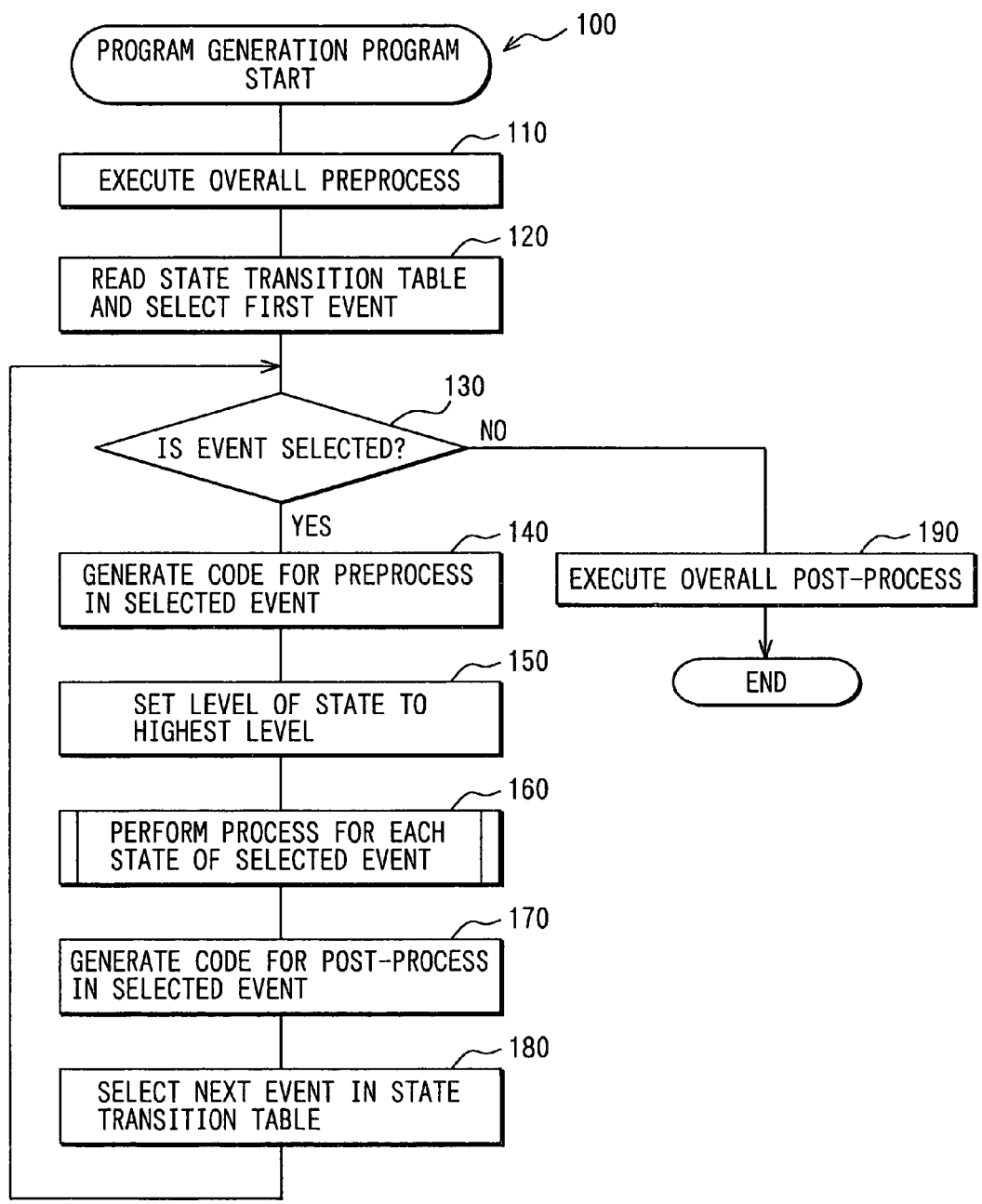
FIG. 6 is a flowchart of a program generation program.

Next, the process of the subroutine 200 is described with reference to the drawings. FIG. 6 is a flowchart of the subroutine 200.

The CPU 16 initiates execution of the subroutine 200. In Step S210, preprocessing is performed relative to a designated hierarchical level of the states. The designated hierarchical level of the states refers to a hierarchical level of the states that is designated as the hierarchical-level variable in Step S150 or Step S430 (described later) in the program generation program 100. The variable is an argument to be passed to the state-by-state subroutine.

What is referred to as the preprocessing is generation of a statement that specifies the current state in a hierarchical level of the state based on the state information stored in the storage medium, and a statement that specifies the start of a range of executable statements specifying actions for the selected event in each of the states in the hierarchical level. The statements are generated in a position immediately after the code generated before the subroutine 200 is called, that is, the code for the preprocessing in Step S140 or Step S410.

For example, each of assignment statements written in the tenth, seventeenth, fortieth, and forty-eighth lines, and each of switch statements written in the eleventh, eighteenth, forty-first, and forty-eighth lines are the code for the preprocessing for the state transition table shown in FIG. 5.

The assignment statements written in the tenth, seventeenth, and fortieth lines are the statements for calling a GetState function for reading current state information from the storage medium. A return value of the GetState function is assigned to a state variable.

The GetState function is further described. The GetState function is defined externally so that the state information is read from the storage medium and part of the state information is returned as a return value according to an argument passed at the time of calling. The state information represents the identification number of the terminal state to which the state of execution corresponds as a description in a latter part.

More practically, the first numerical part of the state information beyond a separator, i.e, a hyphen, that is, the identification number of the state corresponding to the state of execution in the highest hierarchical level is returned as the return value when the GetState function is called with −1 entered as the second argument. the second numerical part of the state information beyond the separator, that is, the identification number of the state corresponding to the state of execution in a child hierarchical level of the highest hierarchical level is returned as the return value when the GetState function is called with 1 entered as the second argument. Therefore, the GetState function identifies a current state of execution in the hierarchical level based on the state information.

In Step S220, the first state on the designated hierarchical level of the states is selected. The hierarchical levels of a state is determined by checking the state transition table to see if the state is the child state of the state identified with the identification number contained in the hierarchical-level variable.

In Step S230, the state selected in Step S220 or Step S270 (described later) is examined if it exists. Step S240 is executed if the state exists, and Step S280 is executed if the state does not exist.

In Step S240, information on the column associated with the state in the state transition table is checked to see if the selected state is the exceptional state. More practically, a state bearing an Exception mark in the column associated with the state in the state transition table is recognized as the exceptional state. A name of the state in the column associated with the state in the state transition table may be checked to see if the name includes the specific character string when the name of the exceptional state includes a specific character string, e.g., "exception." The state may be recognized as the exceptional state when the name includes the specific character string. Process of Step S250 is executed when the selected state is the exceptional state. Process of Step S260 is executed when the selected state is not the exceptional state, that is, when the selected state is the normal state.

In Step S250, a code for handling the exceptional state in the selected state is appended to the preprocessing code generated in Step S210. The code for the exceptional state refers to a code for a function that performs the action specified in the state transition table to be allocated to a pair of the exceptional state and the detected event, on condition that "the detected state does not correspond to any of the normal states devoid of a child." Generation of the exceptional state code is described later.

In Step S260, a code for handling the normal state in the selected state is appended to the preprocessing code generated in Step S210. The code for the normal state refers to a code for a function that performs the action, which is specified in the state transition table to be allocated to a pair of the state and the detected event, on condition that "the detected state corresponds to the normal state." The condition may signify that "the detected state corresponds to the normal state devoid of a child." Generation of the normal state code is described later.

The state transition table is used to select the next state in the designated hierarchical level of the state in Step S270 after Step S250 and Step S260 completes. The next state is one of the states in the designated hierarchical level of the state that has not been selected since the execution of the subroutine 200 started. No state is selected when there is no event that has not been selected since the execution of the subroutine 200 started. Step S230 is executed after Step S270 completes.

The post-processing is performed relative to all of the states in the designated hierarchical level of the state Step S280 when selection of the state is not recognized in Step S230. What is referred to as the post-processing is generation of a code expressing an end of a range of the statements including statements, which specify states in a current hierarchical level of the states, and the executable statements specifying the actions for the selected event in the respective states in the hierarchical level of the states. For example, curly brackets written in the thirties, thirty-sixth, sixty-first, and sixty-seventh lines in the C source code shown in FIG. 10 are the codes for the state transition table shown in FIG. 5.

After Step S280 completes, the process of the subroutine 200 is terminated. Control is returned to a point in the process at which a calling sequence required for the subroutine 200 is terminated, that is, a start point of Step S170 or Step S450 being described later.

Figure 8:
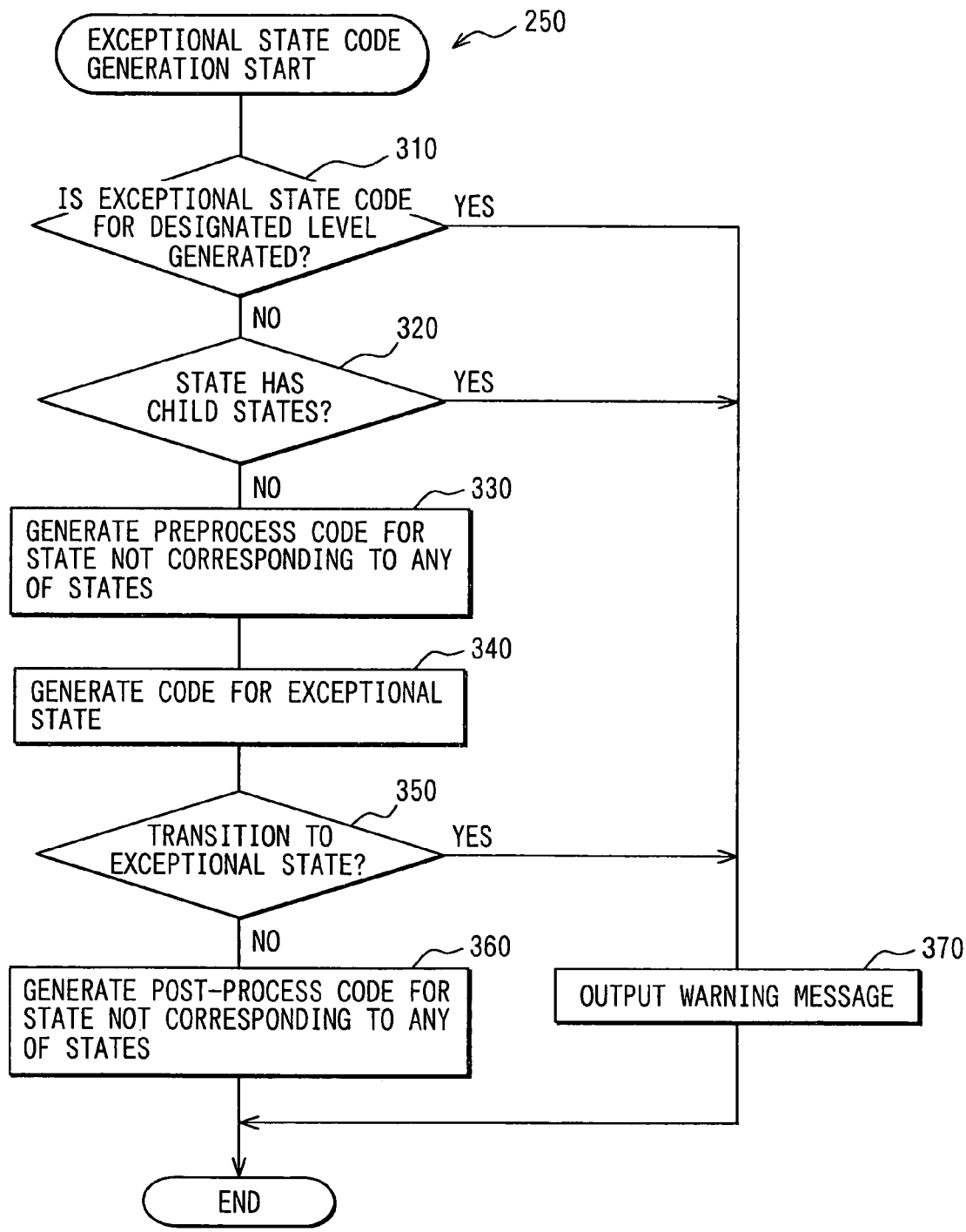
FIG. 8 is a flowchart of an exceptional state code generation process.

Exceptional state code generation of Step S250 is described below in detail. FIG. 8 is a flowchart describing the code generation.

First, in Step S310, whether a code specifying the exceptional state in a currently designated hierarchical level of the states has already been generated is determined. When an exceptional state code has already been generated, it means that a plurality of the exceptional states exists in the current hierarchical level. In this case, in Step S370, a warning message is transmitted to both the display 11 and the HDD 15 that notifies existence of a plurality of the exceptional states. Then, the process of Step S250 is terminated. When an exceptional state code has not been generated, the process of Step S320 is executed.

In Step S320, whether the currently selected exceptional state includes the child states is determined based on the state transition table. When the exceptional state includes the child states, a warning message is transmitted to both the display 11 and HDD 15 that notifies that the exceptional state includes the child states in Step S370. Then, the process of Step S250 is terminated. When the exceptional state does not include any child state, Step S330 is executed.

In Step S330, as a code for the process in the exceptional state, preprocessing part of a code for performing the action, which is specified in the correspondence information allocated to a pair of the exceptional state and a detected event, is generated and appended to an immediately previously generated code on condition that "the detected state does not correspond to any of the normal states in the designated hierarchical level."

More practically, a statement specifying a start point of a range of the statements, such as a conditional statement signifying that "the detected state does not correspond to any of the normal states in the designated hierarchical level of the state," and a statement specifying the action when the condition specified by the conditional statement is met, are generated. For example, when the state transition table shown in FIG. 5 is employed, "default:" statements written in the twenty-sixth, thirty-second, fifty-seventh, and sixty-third lines in FIG. 10 are comparable to the code for the process in the exceptional state. The "default:" statement is written in combination with the aforesaid "switch" statement and a "case" statement. When a variable designated as the argument in the "switch" statement does not agree with any of values specified in the "case" statements, a function is implemented to execute the process represented by the statements within the range from the "default:" statement to an associated "break" statement.

In this case, the condition "the detected state does not correspond to any of the normal states in the designated hierarchical level of the states," means that variables identifying the states in the designated hierarchical level, for example, variables st and st2 in FIG. 10 do not agree with the values specified in the case statements.

In Step S340, a code for the process in the exceptional state is generated. That is, a code of the action in the state transition table to be allocated to a pair of the exceptional state and the selected event is generated to be appended to the code generated in Step S330. For example, when the state transition diagram shown in FIG. 5 is employed, calling sequences of pairs of an Action function and a SetState function written in the twenty-seventh and twenty-eighth lines, thirty-third and thirty-fourth lines, fifty-fourth and fifty-five lines, and sixty-eighth and sixty-ninth lines in FIG. 10 are each comparable to the code for the process in the exceptional state. The Action function is a function defined externally to perform processing specified as an argument. The SetState function is a function defined externally to replace a value, which identifies the state information stored in the storage medium such as the RAM 13 and referred to with the GetState function, with a value specified as the argument. The argument passed to the SetState function represents the identification number of a destination of the state transition included in the action.

In Step S350, whether the transition is made from the exceptional state to any other exceptional state is determined. For this determination, the code generated in immediately previous Step S340 is checked to see if it contains a calling sequence required for the SetState function, and the state transition table is checked to see if it includes information signifying that the state identified with the argument is the exceptional statement. When the transition is made to the exceptional state, a warning message notifying that the transition is made to the exceptional state is transmitted to both the display 11 and HDD 15. Then, the process of Step S250 is terminated. When a transition is not made to any exceptional state, process of Step S360 is executed.

In Step S360, as a code for the process to be performed in the exceptional state, part of a code, which expresses the action which is specified in the correspondence information to be allocated to a pair of the exceptional state and the detected event, for post-processing is generated on condition that "the detected state does not correspond to any of the normal states in the designated hierarchical level of the state."

More practically, a statement indicating an end point of a range of the statements, which specify the actions to be performed when the condition that "the detected state does not correspond to any of the states in the designated hierarchical level of the state" is met, is generated to be appended to the code generated in Step S340. For example, when the state transition table shown in FIG. 5 is employed, the "break" statements written in the twenty-ninth, thirty-fifth, sixtieth, and sixty-sixth lines in FIG. 10 are each comparable to the part of the code for the post-processing.

After Step S360 completes, the process of Step S250 is terminated. Thereafter, the foregoing Step S270 is executed.

Figure 9:
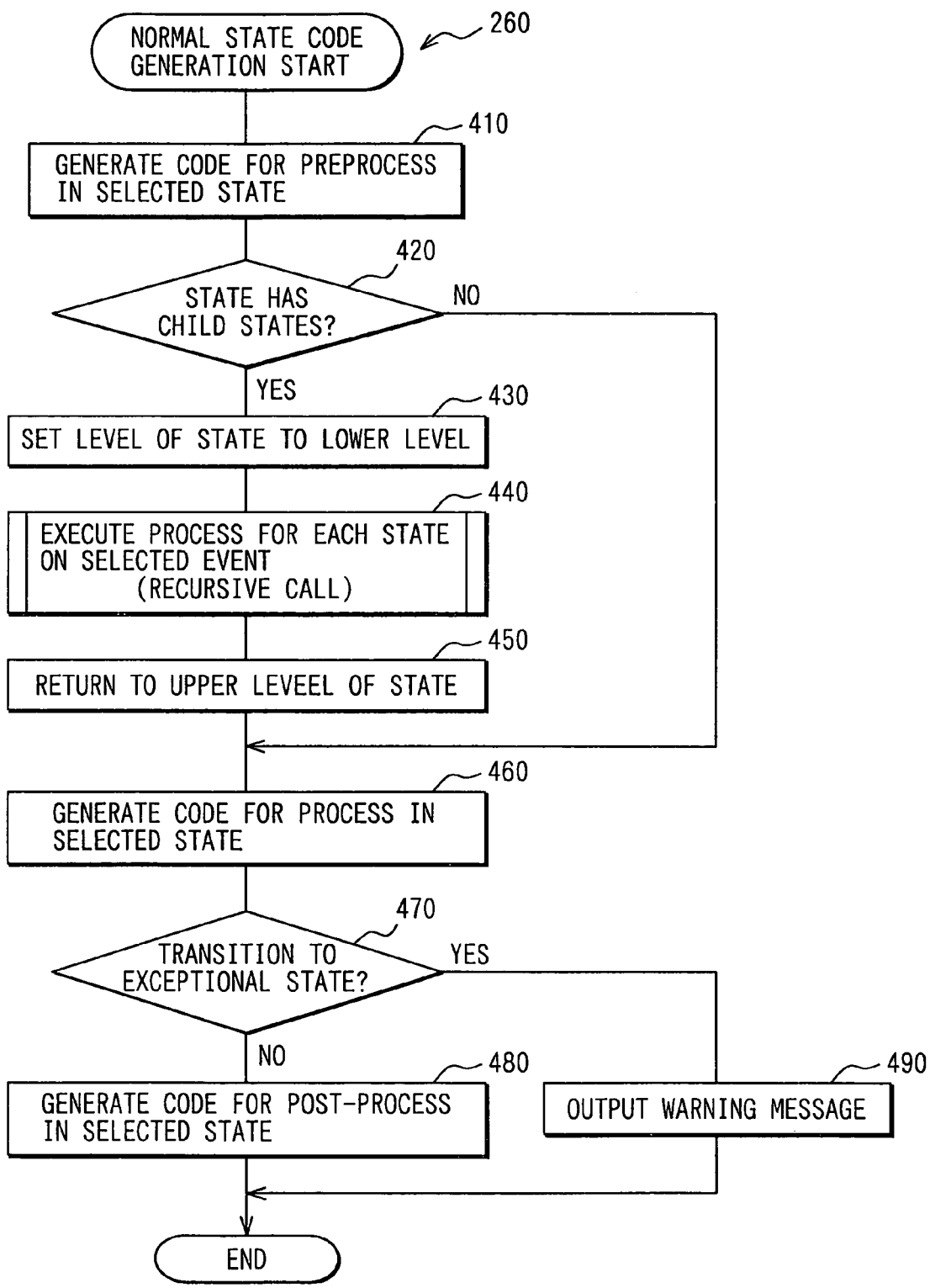
FIG. 9 is a flowchart of a normal state code generation process.

Next, normal state code generation of Step S260 will be described below. FIG. 9 is a flowchart describing the normal state code generation.

First, In Step S410, a preprocessing code that represents preprocessing to be performed in a selected normal state is generated to succeed an immediately previously generated code. More practically, a statement indicating a start point of a range of the statements, such as the conditional statement signifying that "the detected state corresponds to the normal state" and the statement specifying the action to be performed when the condition specified by the conditional statement is met is generated. For example, when the state transition table shown in FIG. 5 is employed, "case:" statements written in the twelfth line, sixteenth line, nineteenth line, twenty-second line, forty-second line, forty-sixth line, forty-ninth line, and fifty-third line in FIG. 10 are each comparable to the preprocessing code.

In Step S420, the state transition table is used to determine whether the selected state includes the child states. When the selected state includes the child states, Step S430 is executed. When the selected state does not include any child state, that is, when the selected state is the terminal state, the process of Step S460 is executed.

In Step S430, a hierarchical level of the states is set to the hierarchical level to which the child states belong, i.e., a lower level. More practically, a hierarchical-level variable is set to the value identifying the hierarchical level to which the child states found in Step S420 belong.

Figure 7:
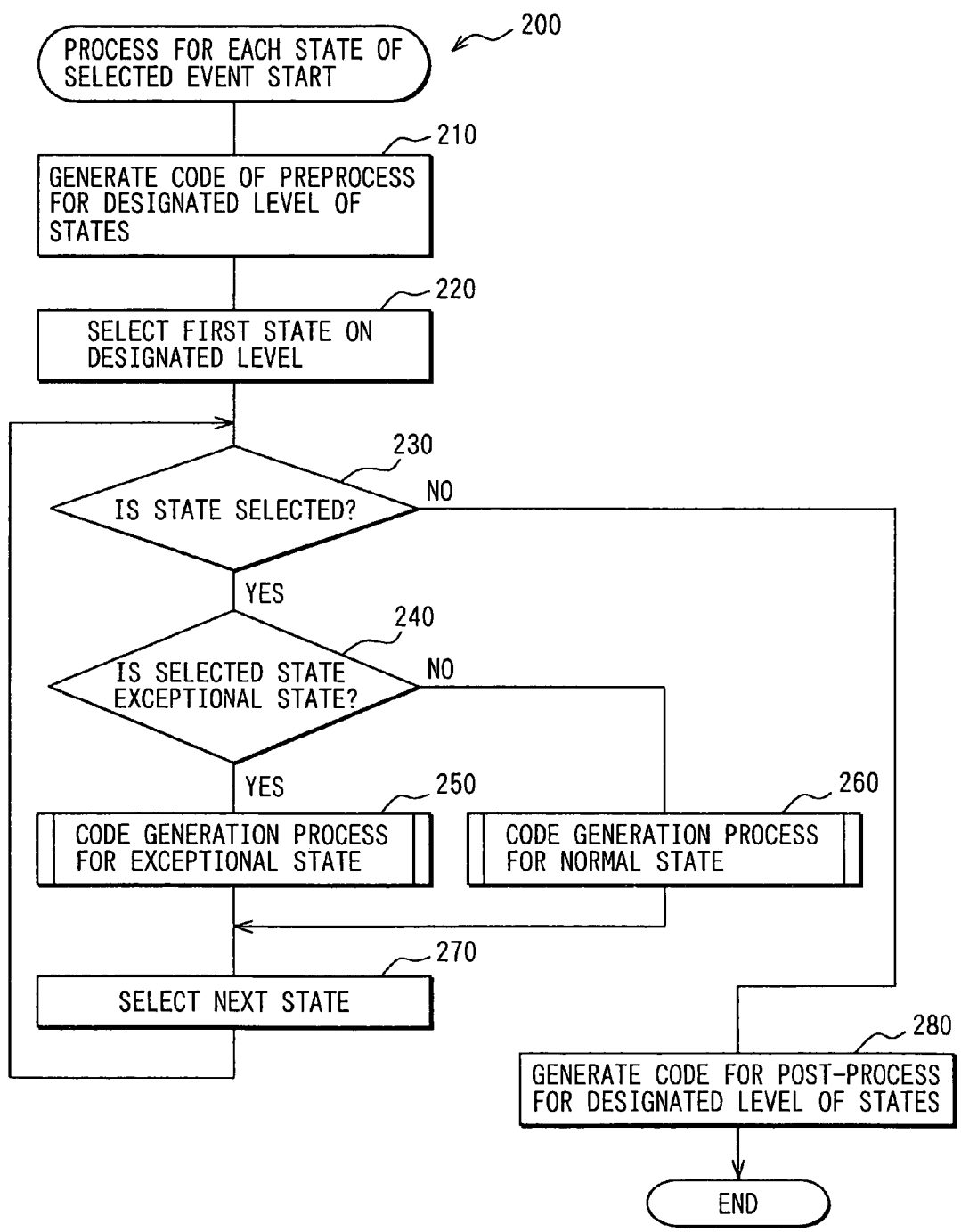
FIG. 7 is a flowchart of a process for each state of selected event.

In Step S440, the process to be performed on a selected event in each state, that is, the process of the subroutine 200 described in the flowchart of FIG. 7 is recursively called and executed. In this manner, when the control is returned to Step S450, code generation is complete relative to the hierarchical level of the child states and lower hierarchical levels. That is, the codes for the actions to be performed in the child states and other states in the lower hierarchical levels are nested in the code for the action to be performed in the state selected at the start of Step S260.

In Step S450, the hierarchical level of the states returns to an original state. That is, the hierarchical-level variable is set back to a value originally designated before it is changed in Step S430.

After Step S450 is complete, Step S460 is executed.

In Step S460, a code for the process defined to be performed in a selected state is generated. That is, a code for the action specified in the state transition table to be allocated to a pair of the state and the selected event is generated and appended to the code generated in Step S410. For example, when the state transition table shown in FIG. 5 is employed, each of the calling sequences of pairs of an Action function and the SetState function written in the thirteenth and fourteenth lines, the twenty-third and twenty-fourth lines, and the fifty-fourth and fifty-fifth lines in FIG. 10 as well as the calling sequence required for the SetState function written in the twentieth line in FIG. 10 is comparable to the code.

In Step S470, whether the transition from the selected normal state to the exceptional state takes place is determined. For this determination, the code generated at immediately previous Step S460 is checked to see if it includes the calling sequence required for the SetState function, and the state transition table is checked to see if it includes information signifying that the state identified with the argument is the exceptional state. When the transition to the exceptional state is made, a warning message notifying that the transition to the exceptional state is made is transmitted to both the display 11 and HDD 15. Then, the process of Step S260 is terminated. When the transition to the exceptional state is not made, the process of Step S480 is executed.

In Step S480, a code for the post-processing to be performed in the selected state is generated. More practically, a statement indicating an end point of a range of the statements specifying the actions to be performed when the condition that "the detected state corresponds to the selected normal state" is met is generated to be appended to the code generated in Step S460. For example, assuming that the state transition table shown in FIG. 5 is employed, the "break" statements written in the fifteenth, twenty-first, twenty-fifth, forty-fifth, fifty-second, and fifty-sixth lines in FIG. 10 are each comparable to the code.

After Step S480 is complete, the process of Step S260 is terminated. Then, Step S270 is executed.

When the CPU 16 executes the program generation program 100, the personal computer system 1 reads the state transition table from the RAM 13 or the HDD 15 (refer to Step S120). Events specified in the state transition table are selected one by one by repeating Steps S130 to S180. Steps S230 to S270 are repeated for each selected event, whereby the event is paired with each of the states in a hierarchical level of the state. Whether a state is the exceptional state or the normal state is determined depending on whether information signifying that the state is the exceptional state is included in the correspondence information (refer to Step S240). Based on the correspondence information, the C source code implementing the functions (1) to (3) is generated (refer to Step S250 and Step S260). When the normal state has child states, Steps S210 to S280 are recursively executed in Step S440. Thus, determination and generation of the C source code are achieved relative to all states in all hierarchical levels or all states starting with the states that belong to the highest hierarchical level and ending with the states that belong to the terminal hierarchical level.

Since Steps S210 to S280 are recursively executed, the C source codes for actions to be performed in a child normal states is nested in the C source code for the action to be performed in a parent normal state. In this manner, part of a code, which expresses the action to be performed in the exceptional state in the designated hierarchical level, for the action of determining whether "the detected state does not correspond to any of the normal states in the hierarchical level of the states" is executed only when the condition that "the detected state corresponds to the normal state in the hierarchical level of the state" is met. In this manner, the condition that "the detected state does not corresponds to any of the normal states in the designated hierarchical level of the state" is equivalent to the condition that "the detected state corresponds to the normal state but does not correspond to any of the child normal states of the normal state" as long as the designated hierarchical level of the state is not the highest hierarchical level.

In the C source code shown in FIG. 10, the function (1) for detecting a current state according to state information stored in the storage medium is implemented by the calling sequence required for a GetState function. The function (2) for detecting occurrence of the event is implemented by the calling sequence required for the GetEvent function. The function (3) for performing the action allocated to a pair of the detected state and the event is implemented by the calling sequence required for the Action function and the SetState function sandwiched between the "case" statement and the "break" statement or the "default" statement and the "break" statement.

A function included in the function (3) for performing the action, which is specified in the correspondence information to be allocated to a pair of the state and the detected event, on condition that "the detected state corresponds to the normal state" is implemented by the calling sequence required for the Action function and the SetState function sandwiched between the "case" statement and the "break" statement.

A function included in the function (3) for performing the action, which is specified in the correspondence information to be allocated to a pair of the exceptional state and the detected event, on condition that "the detected state does not correspond to any of the normal states devoid of a child" is implemented by the calling sequence required for the Action function and the SetState function sandwiched between the "default" statement and the "break" statement.

A case where the condition that "the detected state does not correspond to any of the normal states devoid of a child" is met includes two cases, that is, a case where the condition that "the detected state does not correspond to any of the normal states in the hierarchical level" is met, and a case where the condition that "the detected state corresponds to the normal state but does not correspond to any of the normal states in a child hierarchical level of the normal state" is met.

When the condition that "the detected state does not correspond to any of the normal states in the hierarchical level" is met, the action allocated to the exceptional state in the highest hierarchical level is performed. When the condition that "the detected state corresponds to the normal state but does not correspond to any of the normal states in a child hierarchical level of the normal state" is met, the action allocated to the exceptional state in the child hierarchical level of the normal state is performed.

In this manner, since program generation is performed based on the correspondence information, even when a state of the computer system 1 attained during execution of the generated program is unpredictable, the action allocated to the exceptional state is performed. Therefore, the system will not behave unpredictably. Thus, the present invention can suppress the unsteadiness in the behavior of the system.

Further, since the action is allocated to the exceptional state in association with each event, when the detected state does not correspond to any of the normal states, the behavior of the system can be precisely controlled by designating the variables or the like according to the event currently in effect.

Further, the exceptional state refers to the state that is recognized when the detected state does not correspond to any of the terminal normal states, that is, when the state is unpredictable. In this manner, when the action specified in the correspondence information includes the transition to the exceptional state, there is a possibility that a drawback may occur. In a pair of Steps S350 and S370 in the program generation program 100 or a pair of Steps S470 and S490, the personal computer system 1 in accordance with the present embodiment sends the warning message on condition that the action specified in the correspondence information to be allocated to one state includes the transition to the exceptional state. In this manner, since the software developer is warned against that the correspondence information specifies the state to be changed to the exceptional state, the possibility that the developer may specify the state, which is changed to the exceptional state, in the correspondence information is minimized.

Further, when the program generation program 100 is executed, the personal computer system 1 sends the warning message on condition that the exceptional state specified in the correspondence information includes child states (refer to Step S320 and Step S370). This minimizes the possibility that the software developer may specify the child states of the exceptional state in the correspondence information by mistake.

When the program generation program 100 is executed, the personal computer system 1 sends the warning message on condition that the state specified in the correspondence information includes a plurality of the exceptional states as child states (refer to Step S310 and Step S370). This minimizes the possibility that a situation in which child states of one state include a plurality of the exceptional states, that is, a situation in which a plurality of the exceptional states belongs to the same hierarchical level may take place.

Figure 11:
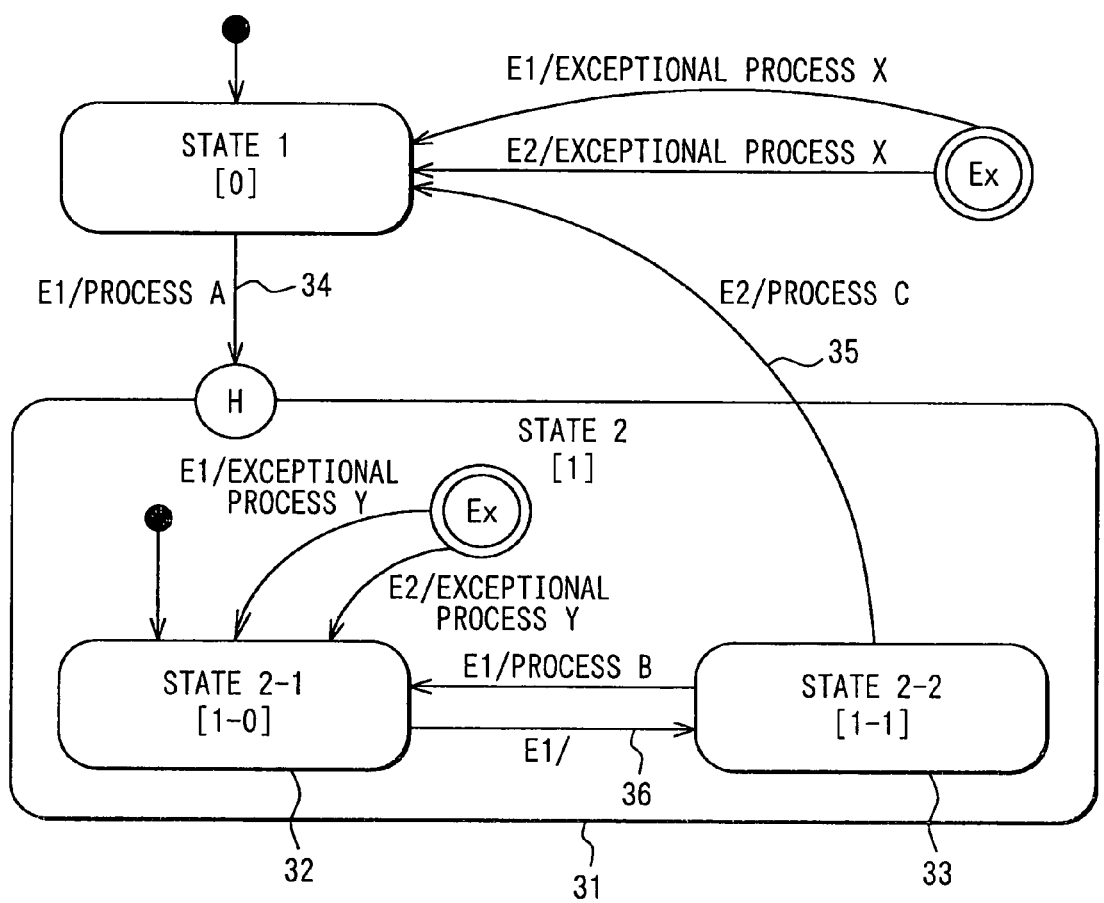
FIG. 11 is an example of a state transition diagram.

In the present embodiment, the correspondence information to be read by the program generation program 100 may be the state transition diagram shown in FIG. 11. The state transition diagram shown in FIG. 11 expresses the same contents as the contents of the state transition table shown in FIG. 5. Therefore, C source code generated based on the state transition diagram shown in FIG. 11 is identical to the one shown in FIG. 10.

The state transition diagram includes graphics defining fields (hereinafter field graphics), and arrows linking the field graphics. One field graphic expresses one state, and the arrow expresses the state transition. In FIG. 11, a rectangle having rounded corners expresses the normal state, and a double circle expresses the exceptional state.

Further, when states have the parent-child relationship, the field graphic expressing a parent state directly encloses the field graphics expressing child states. In this manner, a plurality of the field graphics expressing the states that belong to the hierarchical level is directly enclosed in the same field graphic expressing the parent state. The field graphic that is not enclosed in any field graphic expresses the state in the highest hierarchical level. In FIG. 11, for example, a state 2 expressed by a field graphic 31 includes a state 2-1 expressed by a field graphic 32 and a state 2-2 expressed by a field graphic 33.

Further, the field graphic expressing the normal state presents the name of the normal state and the identification number of the state. Further, the name of the event causing the state transition expressed by the arrow and the process to be performed along with the state transition are mentioned near the arrow. In FIG. 11, for example, an arrow 34 signifies that when the even E1 occurs in the state 1, the process A is performed and the transition from the state 1 to the state 2 is made at the same time. Further, the arrow 35 signifies that when the event E2 occurs in the state 2-2, processing C is performed, and the transition from the state 2-2 to the state 1 is made at the same time. An arrow 36 signifies that when the event E1 occurs in the state 2-1, the transition from the state 2-1 to the state 2-2 is made.

Further, the state expressed by a graphic linked with a black circle by an arrow is the state to which the transition is made first among all states in the hierarchical level.

The exceptional states may be expressed by special graphics discriminated from graphics expressing the normal states. The exceptional states may be expressed using the same field graphics as the normal states. In this case, the name of the exceptional state bears a predetermined character string for indicating the type of the state. In this manner, the name of the exceptional state is information signifying that the state is the exceptional state. Therefore, a state transition diagram creation program that has been adopted in the past may be used to express the exceptional states.

When stored in the RAM 13 or the HDD 15, the state transition diagram is represented by data having entries associated with states. Each entry includes pieces of information on the hierarchical level of the state, the parent state of the state, the child states of the state, the name and the identification number of the state, the graphic expressing the state, the event defined in association with the state, and the action (process and the state transition) associated with the event.

The state transition diagram has the following features that one state is expressed by one field graphic, that the same event is expressed by a plurality of the arrows, and that the arrow of a specific event does not always starts from all graphics expressing all states.

In this manner, as described in relation to the program generation program 100, the event is selected first, and the hierarchical levels are selected one by one in association with each event. The states in each hierarchical level are selected one by one, and the C source code is generated to represent the actions associated with the pairs of the selected events and the states. Further, besides using a so-called event-driven program generation program, a so-called state-driven program generation program may be used. That is, the state-driven program generation program selects a hierarchical level of the states, the states in the hierarchical level are selected one by one, the events defined in association with the state is selected one by one, and the C source code for the actions associated with the pairs of selected events and states is generated by the CPU 16 that executes the state-driven program generation program based on the state transition diagram.

Second Embodiment

A second embodiment of the present invention is described with reference to the drawings. A difference between the present embodiment and the first embodiment is perceived in the following points. That is, the correspondence information generation program in accordance with the first embodiment implements in the CPU 16 functions for receiving the user's input of the state and the event, allocating the action to the pair of the state and event according to the input, storing the correspondence information, which specifies the allocation, in the HDD 15, and presenting the correspondence information to the user. The correspondence information generation program in accordance with the present embodiment further implements in the CPU 16 the functions (A) to (D) described below.

Function (A): receiving the input of the exceptional state.

Function (B): sending the warning message on condition that the user's input of the action including the state transition to the exceptional state is received, and canceling the reception of the input.

Function (C): sending the warning message on condition that other exceptional state in the same hierarchical level as the one to which the received exceptional state belongs, and canceling the reception of the input.

Function (D): sending the warning message on condition that the input causing the exceptional state to include the child states is received, and canceling the reception of the input.

The correspondence information generation program is now described in detail. The CPU 16 initiates the execution of the correspondence information generation program responsively to the user's operation performed on the input device 12. During the execution of the correspondence information generation program, the CPU 16 receives designation of the correspondence information (the state transition diagram or the state transition table), which is an object of editing, responsively to the user's operation performed on the input device 12, and reads the designated correspondence information from the HDD 15. When the correspondence information is the state transition diagram, the correspondence information is displayed on the display 11 in the diagrammatic form. When the correspondence information is the state transition table, it is displayed on the display 11 in the tabular form.

During the execution of the correspondence information generation program, the CPU 16 reflects the new creation, modification, or deletion of the contents on the correspondence information according to the user's operation when the CPU 16 recognizes the newly created state, event, action or any other modification or deletion to the contents. Then, the CPU 16 displays the resultant correspondence information on the display 11 and overwrites the data in the HDD 15.

Figure 12:
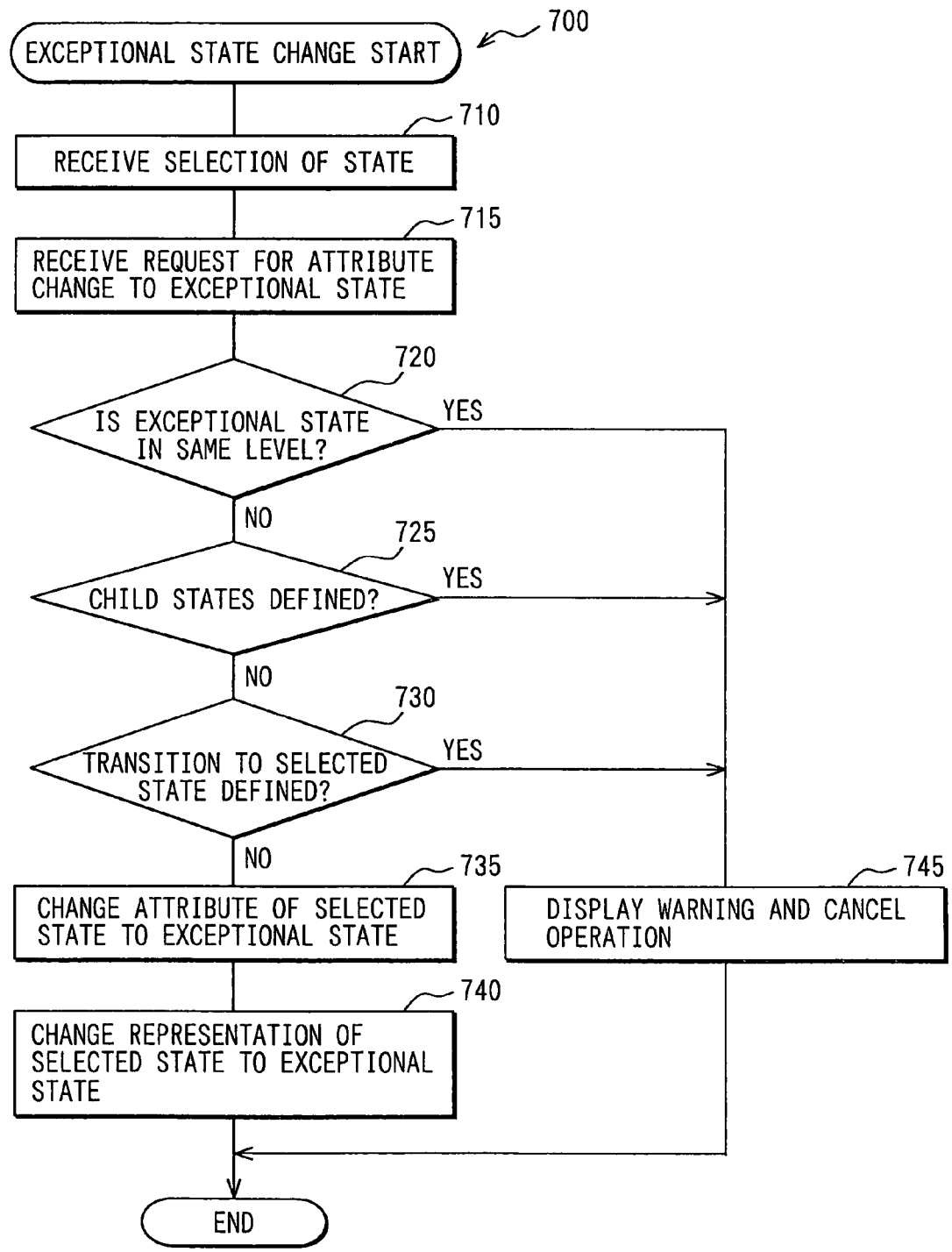
FIG. 12 is a flowchart of an exceptional state change process.
Figure 13:
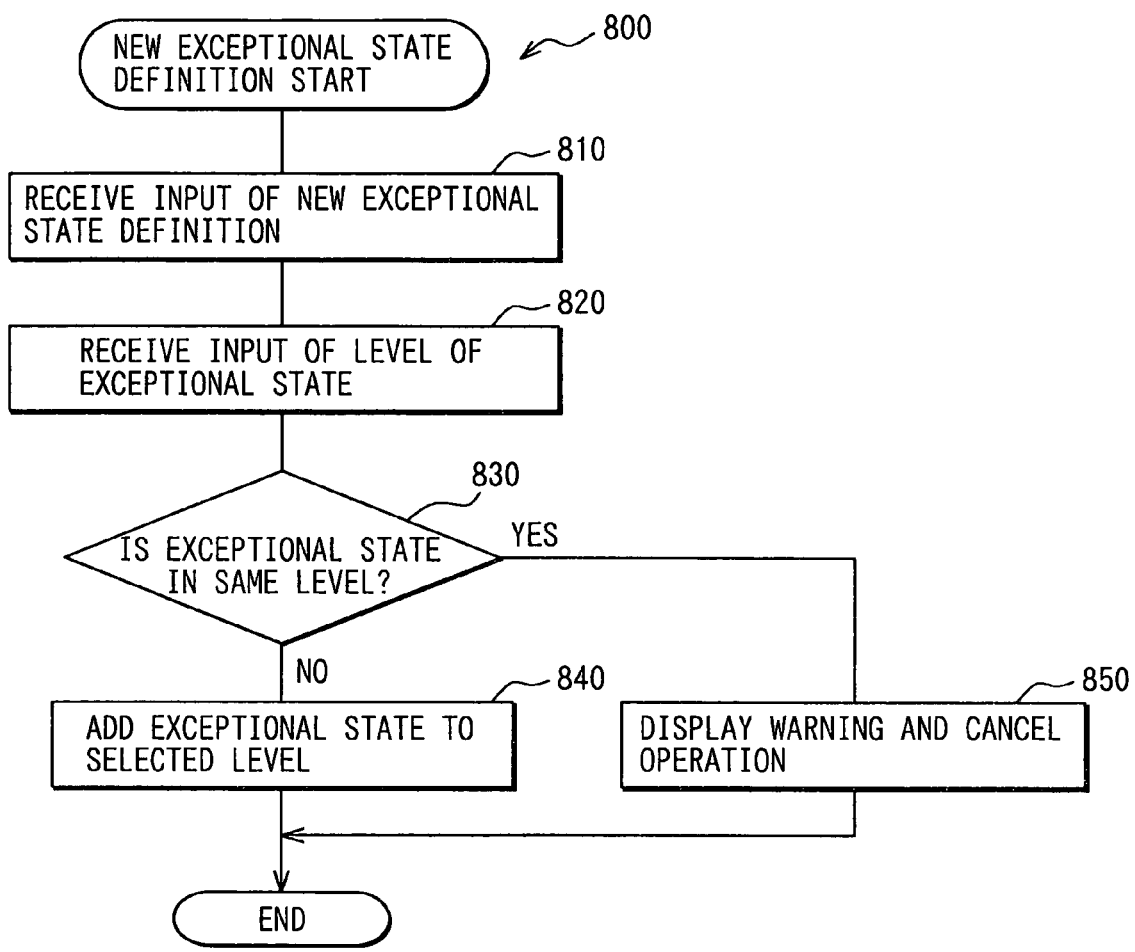
FIG. 13 is a flowchart of a new exceptional state definition process.

FIG. 12 and FIG. 13 are flowcharts describing parts of the correspondence information generation program for receiving the exceptional state, that is, an exceptional state change program 700 and a new exceptional state reception program 800.

The exceptional state change program 700 is part of the correspondence information generation program that receives a change from the normal state to the exceptional state.

The execution of the exceptional state change program 700 is initiated when the user performs the operation for selecting one state on the input device 12. In Step S710, the selection is received.

In Step S715, a request for the change of an attribute of the state from the normal state to the exceptional state is received. More practically, a wait state lasts until a predetermined operation on the input device 12 for changing the normal state into the exceptional state is detected. When the predetermined operation is detected, the control is passed to Step S720.

In Step S720, the correspondence information that is the object of editing is used to determine whether states in the same hierarchical level as the selected state include the exceptional state. When other states include the exceptional state, Step S725 is executed. When other states do not include the exceptional state, an error message notifying that two or more exceptional states belong to the same hierarchical level is sent as warning information in Step S745. The received change is not reflected on the correspondence information being edited but is discarded. Then, the process of the exceptional state change program 700 is terminated.

In Step S725, the correspondence information that is the object of editing is used to determine whether the selected state includes the child states. When the selected state does not include any child state, Step S730 is executed. When the selected state includes the child states, the error message notifying that the exceptional state including child states is about to be created is sent as the warning information in Step S745. The received change is not reflected on the correspondence information being edited but is discarded. Then, the process of the exceptional state change program 700 is terminated.

In Step S730, the correspondence information that is the object of editing is used to determine whether at least one transition from the selected state to the exceptional state is defined. When the transition to the exceptional state is defined, the action allocated to the state includes the transition to the exceptional state. When the transition to the exceptional state is not included, the process of Step S735 is executed. When the transition to the exceptional state is included, the error message notifying that a state from which the transition is made to the exceptional state is about to be created is sent as the warning information in Step S745. The received change is not reflected on the correspondence information being edited but is discarded. Then, the process of the exceptional state change program 700 is terminated.

In Step S735, the selected state is changed into the exceptional state. More practically, the attribute value of the selected state specified in the correspondence information is changed to the value identifying the exceptional state.

In Step S740, a representation of the selected state is changed to a representation of the exceptional state. More practically, the correspondence information in which the change is made in Step S735 overwrites the data in the HDD 15 and transmitted to the display 11. In this manner, the representation of the state displayed on the display 11 is changed from the representation of the normal state to the representation of the exceptional state. After Step S740 is complete, the process of the exceptional state change program 700 is terminated.

The CPU 16 executing the exceptional state change program 700 receives the request for the change of the normal state specified in the correspondence information to the exceptional state (refer to Step S715). In this case, when all of the following three conditions are met, that is, no exceptional state belongs to the same hierarchical level as the state to be changed (refer to Step S720), the state to be changed is devoid of a child (refer to Step S730), and the transition to the state to be changed is not defined (refer to Step S735), the state to be changed is changed to the exceptional state (refer to Step S735). Then, the result of the change is transmitted to both the display 11 and the HDD 15 (refer to Step S740). When at least one of the three conditions is not met, the warning information is transmitted and the request for the change is canceled (refer to Step S745).

Next, the new exceptional state reception program 800 will be described below. The new exceptional state reception program 800 is part of the correspondence information generation program which receives new addition of the exceptional state.

The execution of the new exceptional state reception program 800 is initiated when the user performs the operation on the input device 12 to create a new exceptional state. First, in Step S810, the input of a definition of the new exceptional state, that is, information such as the name of the state and the like is received.

In Step S820, a prompt for encouraging the user to select the hierarchical level on which the exceptional state is defined is transmitted to the display 11. The wait state lasts until the operation performed on the input device 12 for the selection is detected.

When the operation for selection is detected, the correspondence information that is the object of editing is used in Step S830 to determine whether any other exceptional state belongs to the selected hierarchical level. When no other exceptional state belongs to the hierarchical level, Step S840 is executed. When any other exceptional state belongs to the hierarchical level, the error message notifying that two or more exceptional states belong to the same hierarchical level is transmitted as the warning information in Step S850. The received state addition is not reflected on the correspondence information being edited but is discarded. Then, the process of the new exceptional state reception program 800 is terminated.

In Step S840, the new exceptional state is added to the selected hierarchical level specified in the correspondence information being edited according to the information received in Step S810. The correspondence information on which the addition is reflected is transmitted to both the display 11 and the HDD 15. Then, the process of the new exceptional state reception program 800 is terminated.

When the CPU 16 executing the new exceptional state reception program 800 receives the request for new addition of the exceptional state (refer to Step S810 and Step S820), on a condition that no other exceptional state belongs to the same hierarchical level as the state to be changed is met (refer to Step S830), the CPU 16 adds the received state as the new exceptional state to the correspondence information. The result of the addition is transmitted to the display 11 and the HDD 15 (refer to Step S840). When the condition is not met, warning information is transmitted and the request for new addition is canceled (refer to Step S850).

Figure 14:
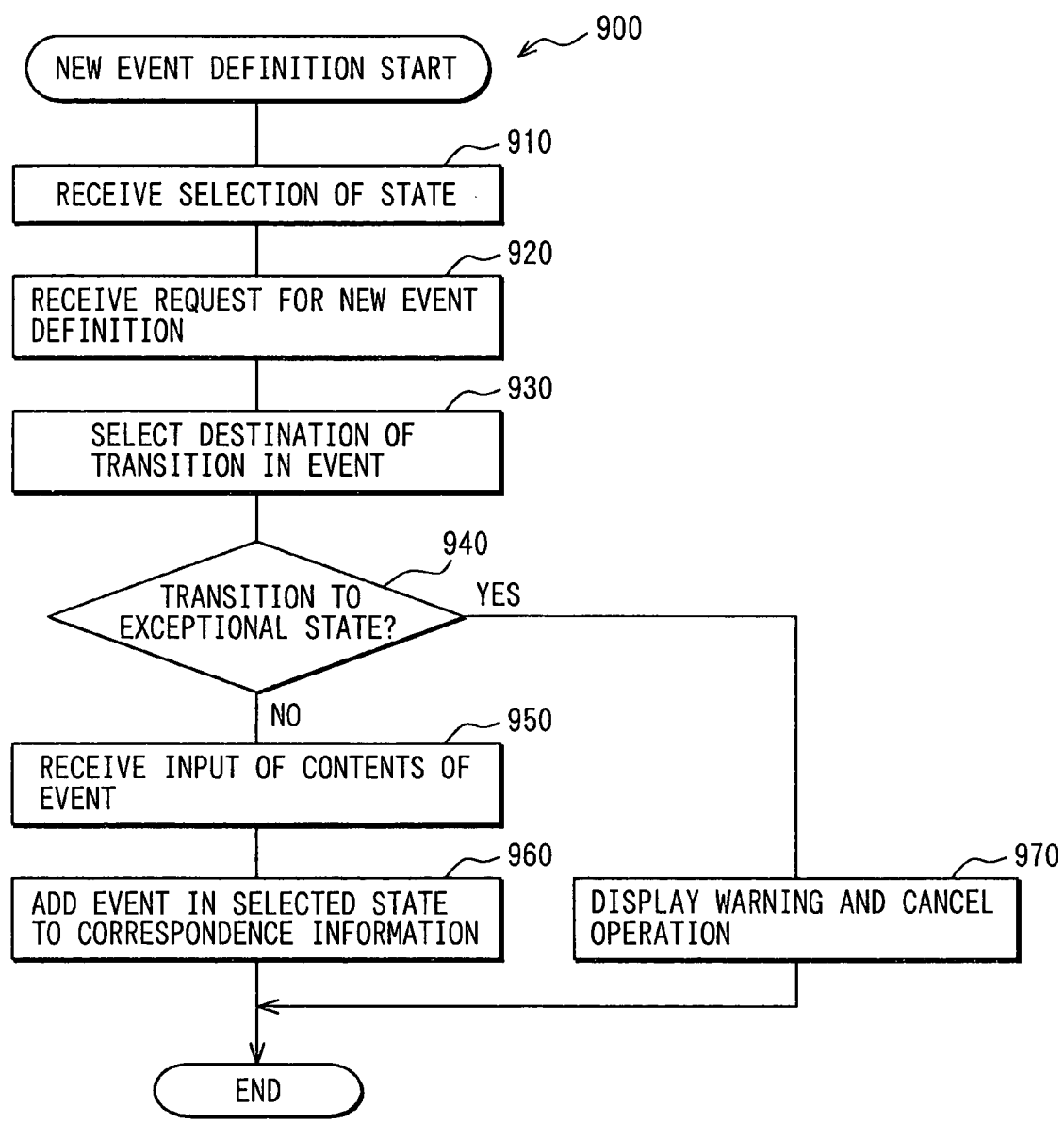
FIG. 14 is a flowchart of a new event definition process.

FIG. 14 is a flowchart describing a new event reception program 900 that is part of the correspondence information generation program which receives the exceptional state.

The new event reception program 900 is part of the correspondence information generation program that newly defines the event relative to the state specified in the correspondence information that is the object of editing.

The execution of the new event reception program 900 is initiated when the input device 12 detects the user's operation for selecting the object state relative to which the new event is defined. In Step S910, the selecting operation is received and the object state is identified.

In Step S920, the wait state lasts until the input device 12 detects the operation performed for defining the new event relative to the selected state. When the defining operation is detected, the request is received. Then, the control is passed to Step S930.

In Step S930, the message prompting the user to select a destination to which the transition is made when the event occurs in the selected state is transmitted to the display 11. When the user's selection performed using the input device 12 is detected, Step S940 is executed.

In Step S940, the correspondence information that is the object of editing is used to determine whether the destination to which the transition is made and which is selected in Step S930 is the exceptional state. When the destination is not the exceptional state, Step S950 is executed. When the destination is the exceptional state, the error message notifying that the destination to which the transition is made is the exceptional information is transmitted as warning information in Step S970. The received event is not reflected on the correspondence information but is discarded. Then, the process of the new event reception program 900 is terminated.

In Step S950, the prompt for encouraging the user to enter or designate the contents of the event, that is, the name of the event, the identification number and the process to be performed when the event occurs in the selected state is displayed on the display 11. The wait state lasts until the designating operation performed on the input device 12 is detected. When the designating operation is complete, Step S960 is executed.

In Step S960, the contents of the detected designation are reflected on the correspondence information. That is, the name of the event causing the transition from the selected state to the selected destination, the process to be performed when the event occurs, and other pieces of information are added to the correspondence information. The resultant correspondence information having the contents reflected thereon is transmitted to the display 11 and overwrites the data in the HDD 15. After Step S960 is complete, the process of the new event reception program 900 is terminated.

When the CPU 16 executing the new event reception program 900 receives the request for the new addition of the event that is associated with the state (refer to Step S920 and Step S930), on the condition that a destination to which the transition is made when the event in the state is not the exceptional state (refer to Step S940), the received event is added as the new event, which is associated with the state, to the correspondence information. The result of the addition is transmitted to both the display 11 and the HDD 15 (refer to Step S960). When above condition is not met, warning information is transmitted. The request for event addition is canceled (refer to Step S970).

When the CPU 16 executes the correspondence information generation program including the exceptional state change program 700, the new exceptional state reception program 800, and new event reception program 900, the personal computer system 1 receives the user's designative input of a pair of the exceptional state and the event and the action associated with the pair. The information including the information on allocation of the associated action to the received pair, and the information signifying that the state is the exceptional state is stored as the correspondence information in the HDD 15 and displayed on the display 11.

In this manner, based on the user's input of the exceptional state, the event, and the associated action, the correspondence information including the information on allocation of the action to the pair of the exceptional state and the event, and the information signifying that the state is the exceptional state is stored in the storage medium. When the program generation program 100 described in relation to the first embodiment is executed, the C source code is generated as the program A based on the correspondence information.

The correspondence information generation program is created so that the warning message is transmitted to cancel the received action when the action including the state transition to the exceptional state is received. In this manner, the warning message is issued notifying that the state to be changed to the exceptional state is specified in the correspondence information. This minimizes the possibility that the software developer specifies the state, which is changed to the exceptional state, in the correspondence information.

When the exceptional state other than a received exceptional state belongs to the same hierarchical level as the received exceptional state, that is, when the received exceptional state is the child of the normal state and the child states of the normal state specified in the correspondence information include other exceptional state, the correspondence information generation program transmits the warning message to cancel the received exceptional state. This minimizes the possibility that the situation in which one state includes a plurality of the exceptional states as child states, that is, the situation in which a plurality of the exceptional states belongs to the same hierarchical level may take place.

When the correspondence information generation program recognizes a possibility that the exceptional state including child states may be created based on the user's input of the exceptional state, the correspondence information generation program transmits the warning message to cancel the received input. This minimizes the possibility that the software developer may specify the state, which is the child of the exceptional state, in correspondence information.

When the image displayed on the display 11 in Step S740, Step S840, or Step S960 is the state transition diagram, graphics expressing the exceptional state and the normal state respectively are, as shown in FIG. 11, different from each other. That is, the exceptional state is expressed by the double circle and the normal state is expressed by the rectangle having rounded corners. In this manner, the user can easily discriminate the normal state from the exceptional state.

When the image displayed on the display 11 in Step S740, Step S840, or Step S960 is the state transition table, the Exception mark may be, as shown in FIG. 5, appended to the exceptional state as the mark identifying the exceptional state.

In the above embodiments, the CPU 16 is equivalent to a computer system that executes the program generation program and the correspondence information generation program.

Although the present invention has been fully described in connection with the preferred embodiments thereof with reference to the accompanying drawings, it is to be noted that various changes and modifications will become apparent to those skilled in the art.

For example, the action is allocated to a pair of the exceptional state and the event in the state transition diagram and the state transition table employed in the present embodiment. However, the action may be allocated to the exceptional state irrespective of the event. When the current state dose not correspond to any terminal normal state, the program to be generated based on the state transition diagram or the state transition table may allow the computer system to perform the action allocated to the exceptional state.

Further, the correspondence information employed in the above embodiments specifies the exceptional state on each hierarchical level. However, only one exceptional state may be specified in one state transition diagram or state transition table irrespective of the number of hierarchical levels. The program generation system may generate the program "that implements a function, which performs the action allocated to the exceptional state, in the computer system on condition that the detected state does not correspond to any of terminal states."

According to the present embodiment, what is generated by the program generation system is the C source code. What is generated by the program generation program is not limited to the source code but may be an object code.

According to the present embodiment, the default statement that is paired with the "switch" statement is adopted as the statement, which represents detection of "the case where the detected state does not correspond to any of terminal states," in the program generated by executing the program generation program. The present invention is not limited to this mode. That is, an ELSE clause paired with an IF statement may be used.

According to the present embodiment, designation of the action to be performed when the state is exceptional is specified in the correspondence information as the information signifying that the state is the exceptional state and information on designation of the action allocated to the exceptional state. The present invention is not limited to this mode.

For example, the state specified in the correspondence information may not have the information, which discriminates the exceptional state from the normal state, appended thereto. Information on the action to be performed in the exceptional state, that is, exceptional action information may be appended thereto as an additional information. The exceptional action information may be specified in the correspondence information in association with each of the hierarchical levels specified in the correspondence information.

When the exceptional action information is allocated to each hierarchical level, the CPU 16 executing the program generation program should read the correspondence information and generate the source code that implements functions (a) to (e) described below in the computer system.

Function (a): detecting the current state according to the state information stored in the storage medium.

Function (b): detecting occurrence of the event.

Function (c): performing the action allocated to a pair of the detected state and the event.

Function (d): performing the exceptional action, which is allocated to the highest hierarchical level, on condition that the detected state does not correspond to any of the states specified in the correspondence information.

Function (e): performing the exceptional action associated with the hierarchical level, to which the child state belongs, on condition that the detected state corresponds to the state specified in the correspondence information but does not correspond to any of the child states of the state.

In order to receive the input of the exceptional action, the correspondence information generation program may implement in the CPU 16 a function, which receives the input of the exceptional action associated with the hierarchical level, stores the correspondence information specifying the received exceptional action in the HDD 15, and displays the correspondence information on the display 11, instead of the functions (A) to (D) described in relation to the second embodiment.

More practically, an indication for receiving designation of the exceptional action is displayed on the display 11. The designative input of the associated hierarchical level and the action which the user enters from the input device 12 is received, and the received designative input is stored in the HDD 15. Further, the correspondence information specifying the presence of the exceptional action is displayed on the display 11.

For example, when the correspondence information is the state transition diagram, the character string specifying the received action or the mark indicating the presence of the exceptional action is displayed within the field graphic expressing the state whose child states belong to a received associated hierarchical level. Further, when the correspondence information is the state transition table, the mark indicating the presence of the exceptional action or indicating the contents of the action may be specified in the column associated with the state whose child states belong to the received associated hierarchical level. In this case, when the received associated hierarchical level is the highest hierarchical level, the mark indicating the presence of the exceptional action or the contents of the action may be specified in the first row and first column in the table shown in FIG. 5.

Such changes and modifications are to be understood as being within the scope of the present invention as defined by the appended claims.

What is claimed is:

1. A method for generating a control program that implements a plurality of practical means to a computer by using a program generation program, the method in the program generation program comprising the steps of:

reading and storing correspondence information that specifies allocation of an action to a process state stored in a storage medium in the computer;

determining whether the process state in the correspondence information is either of an exceptional process state or a normal process state based on an exception attribute of the process state in the correspondence information; and generating the control program based on the correspondence information, wherein the execution of the control program implements the practical means to the computer, the practical means includes:

a process state detection means for detecting that the process state in process state information stored in the storage medium in the computer is either of the normal process state or the exceptional process state in the correspondence information based on whether the process state indicates either of the normal process state or the exceptional process state in the correspondence information;

a normal process handling means for performing the action allocated to the normal process state specified in the correspondence information if the process state detected by the process state detection means is the normal process state, wherein the action allocated to the normal process state generates a normal process state handling code that handles the normal process state; and an exceptional process handling means for performing the action allocated to the exceptional process state specified in the correspondence information if the process state detected by the execution of the control program is not the normal process state, wherein the action allocated to the exceptional process state generates an exceptional process state handling code that handles the process state not corresponding to the normal process state, the exceptional process state handling code is added to the control program for representing a state transition to a pre-defined state in the correspondence information stored in the storage medium, and the exceptional process state not corresponding to the normal process state is handled by the execution of the control program having the exceptional process state handling code.

2. The method according to claim 1, wherein the practical means further includes an event detection means for detecting an event in the computer, the correspondence information is used for specifying allocation of the action to the process state having the event, the normal process handling means performs the action allocated to the process state having the event specified in the correspondence information if the process state is the normal process state, the exceptional process handling means performs the action allocated to the exceptional process state having the event specified in the correspondence information if the process state is not the normal process states, and the normal process handling means and the exceptional process handling means store the process state after a state transition in the process state information in the storage medium if the action includes the state transition.

3. The method according to claim 2 further comprising the steps of:

determining whether each process state having the event specified in the correspondence information is either of the exceptional process state or the normal process state; and generating a portion of the control program that implements the exceptional process handling means in the computer if the process state is the exceptional process state.

4. The method according to claim 3, wherein a warning message is generated if the action allocated to the process state includes the state transition to the exceptional process state.

5. The method according to claim 4, wherein the process state specified in the correspondence information is so structured that one process state includes a plurality of subordinate process states, and the exceptional process handling means performs the action allocated to the exceptional process state specified in the correspondence information if the subordinate process state in the normal process state is not the normal process state.

6. The method according to claim 5, wherein the warning message is generated if the exceptional process state includes at least one subordinate process state.

7. The method according to claim 5, wherein the warning message is generated if one process state includes a plurality of exceptional subordinate process states.

8. The method according to claim 1, wherein the exception attribute of the process state exists in a process state name specified in the correspondence information.

9. The method according to claim 1 further comprising the steps of:

receiving an input of an exceptional process state and an action associated therewith; and storing the correspondence information that specifies allocation of the action in the input to the exceptional process state in the input with an attribute of the process state as the exceptional process state.

10. A method for generating a control program that implements a plurality of practical means in a computer by using a generation program comprising the steps of:

reading correspondence information that specifies allocation of an action to a process state stored in a storage medium in the computer;

determining whether the process state in the correspondence information is either of an exceptional process state or a normal process state based on an exception attribute of the process state in the correspondence information; and generating the control program based on the correspondence information, wherein the control program implements the practical means to the computer, the practical means includes:

a process state detection means for detecting the process state in process state information stored in the storage medium in the computer;

a normal process handling means for performing the action allocated to the normal process state specified in the correspondence information if the process state is the normal process state; and an exceptional process handling means for performing the action allocated to the exceptional process state specified in the correspondence information if the process state is not the normal process state, wherein the correspondence information is represented by combination of graphic representation, the graphic representation includes a state form representing the process state and a transition form representing the state transition, and the state form having an appendix represents the exception attribute of the process state.

11. A program generation system implemented in a computer comprising:

a reading means for reading and storing correspondence information that specifies allocation of an action to a process state;

a determining means for determining whether the process state specified in the correspondence information is either of an exceptional process state or a normal process state on the basis of an exception attribute in the correspondence information; and a generating means for generating a program based on the correspondence information read by the reading means, wherein the execution of the program implements the practical means in the computer, the practical means includes:

a process state detection means for detecting that the process state in process state information stored in a storage medium in the computer is either of the normal process state or the exceptional process state in the correspondence information based on whether the process state indicates either of the normal process state or the exceptional process state in the corresponding information;

a normal process handling means for performing the action allocated to the normal process state specified in the correspondence information if the process state detected by the process state detection means is the normal process state, wherein the action allocated to the normal process state generates a normal process state handling code that handles the normal process state; and an exceptional process handling means for performing the action allocated to the exceptional process state specified in the correspondence information if the process state detected by the execution of the program does not correspond to any of the normal process state, wherein the action allocated to the exceptional process state generates an exceptional process state handling code that handles the process state not corresponding to the normal process state, the exceptional process state handling code is added to the program for representing a state transition to pre-defined state in the correspondence information stored in the storage medium, and the exceptional process state not corresponding to the normal process state is handled by the execution of the program having the exceptional process state handling code.

12. The program generation system according to claim 11 further comprising:
a receiving means for receiving an input of the exceptional process state having the action associated therewith from a user; and
a storage control means for storing the correspondence information including the exceptional process state having the action with the exception attribute in the storage medium for the program generation system,
wherein the receiving means and the storage means are implemented by the program to store the correspondence information in the storage medium according to the input from the user.

13. The program generation system according to claim 12 further comprising a warning means implemented by the program,
wherein the warning means outputs a warning message if the receiving means receives the input of the action including a state transition to the exceptional process state.

14. The program generation system according to claim 13, wherein the process state specified in the correspondence information is so structured that one process state includes a plurality of subordinate process states, and
the warning means outputs the warning message if the exceptional process state in the input is the subordinate process state of a normal process state having at least one exceptional subordinate process state specified in the correspondence information.

15. The program generation system according to claim 13, wherein the process state specified in the correspondence information can include at least two subordinate process state, and
the warning means outputs the warning message if the receiving means receives the input of the exceptional process state having the subordinate process state.

16. A program generation system implemented in a computer comprising:
a reading means for reading correspondence information that specifies allocation of an action to a process state;
a determining means for determining whether the process state specified in the correspondence information is either of an exceptional process state or a normal process state on the basis of an exception attribute in the correspondence information; and
a generating means for generating a program based on the correspondence information read by the reading means,
wherein the program implements the practical means in the computer, the practical means includes:
a process state detection means for detecting the process state in process state information stored in a storage medium in the computer;
a normal process handling means for performing the action allocated to the normal process state specified in the correspondence information if the process state is the normal process state;
an exceptional process handling means for performing the action allocated to the exceptional process state specified in the correspondence information if the process state does not corresponds to any of the normal process state;
a receiving means for receiving an input of the exceptional process state having the action associated therewith from a user;
a storage control means for storing the correspondence information including the exceptional process state having the action with the exception attribute in the storage medium for the program generation system; and
a display control means for displaying an image on a display device according to the correspondence information,
wherein the receiving means and the storage means are implemented by the program to store the correspondence information in the storage medium according to the input from the user,
wherein the display control means is implemented by the program,
the image has graphic forms including a state form representing the process state and a transition form representing the state transition, and
the exceptional process state and the normal process state are represented by different graphic forms.

17. A program generation system implemented in a computer comprising:
a reading means for reading correspondence information that specifies allocation of an action to a process state;
a determining means for determining whether the process state specified in the correspondence information is either of an exceptional process state or a normal process state on the basis of an exception attribute in the correspondence information; and
a generating means for generating a program based on the correspondence information read by the reading means,
wherein the program implements the practical means in the compute, the practical means includes:
process state detection means for detecting the process state in process state information stored in a storage medium in the computer;
a normal process handling means for performing the action allocated to the normal process state specified in the correspondence information if the process state is the normal process state;
an exceptional process handling means for performing the action allocated to the exceptional process state specified in the correspondence information if the process state does not corresponds to any of the normal process state;
a receiving means for receiving an input of the exceptional process state having the action associated therewith from a user;
a storage control means for storing the correspondence information including the exceptional process state having the action with the exception attribute in the storage medium for the program generation system; and
a display control means for displaying an image on a display device according to the correspondence information,
wherein the receiving means and the storage means are implemented by the program to store the correspondence information in the storage medium according to the input from the user,
wherein the display control means is implemented by the program,
the image includes the correspondence information represented in a tabular form, and
the tabular form has a mark for representing the exceptional process state.

18. A computer program product comprising a non-transitory computer-readable medium having computer program logic recorded thereon for enabling generation of a control program in a computer, the computer program logic comprising:
- a reading procedure for reading and storing correspondence information that specifies allocation of an action to a process state stored in a storage medium in the computer;
- a determining procedure for determining whether the process state specified in the correspondence information is either of an exceptional process state or a normal process state on the basis of an exception attribute in the correspondence information; and
- a generating procedure for generating a program based on the correspondence information,
- wherein the execution of the control program implements practical means in the computer, the practical means includes:
  - a process state detection means for detecting that the process state in process state information stored in the storage medium in the computer is either of the normal process state or the exceptional process state in the correspondence information based on whether the process state indicates either of the normal process state or the exceptional process state in the correspondence information;
  - a normal process handling means for performing the action allocated to the normal process state specified in the correspondence information if the process state detected by the process state detection means is the normal process state, wherein the action allocated to the normal process state generates a normal process state handling code that handles the normal process state; and
  - an exceptional process handling means for performing the action allocated to the exceptional process state specified in the correspondence information if the process state detected by the execution of the control program does not correspond to any of the normal process state, wherein the action allocated to the exceptional process state generates an exceptional process state handling code that handles the process state not corresponding to the normal process state,
- the exceptional process state handling code is added to the control program for representing a state transition to a pre-defined state in the correspondence information stored in the storage medium, and
- the exceptional process state not corresponding to the normal process state is handled by the execution of the control program having the exceptional process state handling code.

19. A method for generating a program for implementing a plurality of practical means to a computer, the method comprising the steps of:
- reading and storing correspondence information that specifies allocation of an action to a process state stored in a storage medium in the computer;
- determining whether the correspondence information read by the reading means includes the action for an exceptional process state; and
- generating the program based on the correspondence information,
- wherein execution of the program implements the practical means in the computer, the practical means includes:
  - a process state detection means for detecting that the process state in process state information stored in the storage medium in the computer is either of a normal process state or an exceptional process state in the correspondence information based on whether the process state indicates either of the normal process state or the exceptional process state in the correspondence information;
  - a normal process handling means for performing the action allocated to the normal process state in the correspondence information, wherein the action allocated to the normal process state generates a normal process state handling code that handles the normal process state; and
  - an exceptional process handling means for performing the action allocated to the exceptional process state specified in the correspondence information if the process state detected by the execution of the program does not correspond to any of the process state in the correspondence information, wherein the action allocated to the exceptional process state generates an exceptional process state handling code that handles the process state not corresponding to the normal process state,
- the exceptional process state handling code is added to the program for representing a state transition to a pre-defined state in the correspondence information stored in the storage medium, and
- the exceptional process state not corresponding to the normal process state is handled by the execution of the program having the exceptional process state handling code.

20. The method according to claim 19,
wherein the process state in the correspondence information includes at least two subordinate process states.

21. The method according to claim 20 further comprising the step of determining whether the correspondence information allocates the action to the exceptional process state in a subordinate process state,
wherein the exceptional process handling means performs the action when the process state is one of the process states in the correspondence information without corresponding to any subordinate process state.

22. The method according to claim 21 further comprising the steps of:
- receiving an input of an exceptional process state and an action associated therewith; and
- storing the correspondence information that associates the action in the input with the exceptional process state.

23. A program generation system in a computer comprising:
- a reading means for reading and storing correspondence information that specifies allocation of an action to a process state in a storage medium in the computer;
- a determining means for determining whether the correspondence information read by the reading means includes the action for an exceptional process state; and
- a generating means for generating a program based on the correspondence information read by the reading means,
- wherein execution of the program implements the practical means in the computer, the practical means includes:
  - a process state detection means for detecting that the process state in process state information stored in the storage medium in the computer is either of a normal process state or the exceptional process state in the correspondence information based on whether the process state indicates either of the normal process state or the exceptional process state in the correspondence information;

a process handling means for performing the action allocated to the normal process state in the correspondence information, wherein the action allocated to the normal process state generates a normal process state handling code that handles the normal process state; and an exceptional process handling means for performing the action allocated to the exceptional process state specified in the correspondence information if the process state detected by the execution of the program does not correspond to any process state in the correspondence information, wherein the action allocated to the exceptional process state generates an exceptional process state handling code that handles the process state not corresponding to the normal process state, the exceptional process state handling code is added to the program for representing a state transition to a pre-defined state in the correspondence information stored in the storage medium, and the exceptional process state not corresponding to the normal process state is handled by the execution of the program having the exceptional process state handling code.

24. The program generation system according to claim 23 further comprising:

a receiving means for receiving an input of the exceptional process state having the action associated thereto from a user; and a storage control means for storing the correspondence information including the exceptional process state having the action with the exception attribute in the storage medium in the computer, wherein the receiving means and the storage means are implemented by the program for storing the correspondence information in the storage medium in the computer.

25. A computer program product comprising a non-transitory computer readable medium having computer program logic recorded thereon for enabling generation of a control program in a computer, the computer program logic comprising:

a reading procedure for reading and storing correspondence information that specifies allocation of an action to a process state;

a determining procedure for determining whether the correspondence information read by the reading means includes the action for an exceptional process state; and a generating procedure for generating the control program based on the correspondence information read by the reading means, wherein execution of the control program implements the practical means in the computer, the practical means includes:

a process state detection means for detecting that the process state in process state information stored in the computer is either of a normal process state or the exceptional process state in the correspondence information based on whether the process state indicates either of the normal process state or the exceptional process state in the correspondence information;

a process handling means for performing the action allocated to the process state in the correspondence information, wherein the action allocated to the normal process state generates a normal process state handling code that handles the normal process state; and an exceptional process handling means for performing the action allocated to the exceptional process state specified in the correspondence information if the process state detected by the execution of the control program does not correspond to any of the process states in the correspondence information, wherein the action allocated to the exceptional process state generates an exceptional process state handling code that handles the process state not corresponding to the normal process state, the exceptional process state handling code is added to the control program for presenting a state transition to a pre-defined state in the correspondence information stored in the storage medium, and the exceptional process state not corresponding to the normal process state is handled by the execution of the control program having the exceptional process state handling code.

26. A method for generating a control program that implements a plurality of practical means to a computer, the computer (a) reads and stores correspondence information that associates an action to a process state stored in a memory of the computer for controlling a process in the computer, (b) determines whether the process state in the correspondence information is either of a normal process state or an exceptional process state based on an exception attribute of the process state in the correspondence information, and (e) generates the control program based on the correspondence information, the method comprising:

adding to the control program a program code of a process state detection means for detecting that the process state in the memory is either of the normal process state or the exceptional process state;

adding to the control program a program code of a normal process handling means for performing the action allocated to the normal process state specified in the correspondence information if the detected process state is corresponding to the normal process state; and adding to the control program a program code of an exceptional process handling means for performing the action allocated to the exceptional process state specified in the correspondence information if the detected process state is not corresponding to the normal process state, wherein the generated control program executed in one process on the computer handles, by the execution of the generated control program in the other process on the computer, the exceptional process state not corresponding to the normal process state when the execution of the generated control program causes the exceptional process state, and the exceptional process state transits to one of pre-defined states in the correspondence information stored in the memory by the execution of the generated control program in the other process.

27. A method for generating a control program that implements a plurality of practical means to a computer, the computer (a) reads and stores correspondence information that associates an action to a process state stored in a memory of the computer for controlling a process in the computer, (b) determines whether the process state in the correspondence information is either of a normal process state or an exceptional process state based on an exception attribute of the process state in the correspondence information, and (c) generates the control program based on the correspondence information, the method comprising:

adding to the control program a program code of a process state detection means for detecting that the process state in the memory is either of the normal process state or the exceptional process state;

adding to the control program a program code of a normal process handling means for performing the action allocated to the normal process state specified in the correspondence information if the detected process state is corresponding to the normal process state; and adding to the control program a program code of an exceptional process handling means for performing the action allocated to the exceptional process state specified in the correspondence information if the detected process state is not corresponding to the normal process state, wherein the generated control program executed in one process on the computer handles, by parallel execution of the generated control program in the other process on the computer, an event having no pre-defined action in the correspondence information, when the execution of the generated control program results in the event having no pre-defined action, and the event having no pre-defined action is associated with an action of state transition to one of pre-defined states in the correspondence information in the memory by the execution of the generated control program in the other process.

* * * * *